United States Patent [19]
Baker

[11] 3,802,151
[45] Apr. 9, 1974

[54] ARTICLE HANDLING APPARATUS
[75] Inventor: Earl A. Baker, Big Flats, N.Y.
[73] Assignee: Corning Glass Works, Corning, N.Y.
[22] Filed: Jan. 17, 1973
[21] Appl. No.: 324,359

[52] U.S. Cl. .................. 53/59 R, 53/246, 53/251, 214/309
[51] Int. Cl. ..................... B65b 57/20, B65b 5/10
[58] Field of Search ................. 53/59 R, 246, 251; 214/309

[56] References Cited
UNITED STATES PATENTS
2,976,659  3/1961  Flanagan et al. ............. 53/246 X
3,517,831  6/1970  Hahn ......................... 214/309 X Primary Examiner—Travis S. McGehee
Attorney, Agent, or Firm—Charles W. Gregg

[57] ABSTRACT

Apparatus for handling a plurality of disk-like articles and stacks of trays each having, in their upper surfaces, rows and columns of pockets or nests for holding the disk-like articles each of which may, for example, be a lense, or a frame or holder for a lense of a relatively small diameter. A row of articles is picked up by a row or gang of vacuum chucks and transferred in a selected direction between each of the rows of pockets or nests in the trays and an article delivery location. The apparatus handles each tray of a stack of trays and intermittently moves each tray in a selected direction through a path of travel including therein an intermediate location where the article transfers are made between such location and the article delivery location. After all of the rows of a tray have individually dwelled at the intermediate location for the article transfers to be made, the tray is intermittently or stepwise moved to the end of the path of travel where the trays are handled to reform a stack thereof. At the article delivery location the disk-like articles are handled one at a time and means are provided to count the individual article handling operations until a row or sequence of the articles, equal in number to the pockets or nests in each of the rows thereof in the trays, has been counted. The row or gang of vacuum chucks is then actuated to perform a transfer of a row of the disk-like articles in said selected direction between the article delivery location and the intermediate location.

24 Claims, 34 Drawing Figures

Fig. I

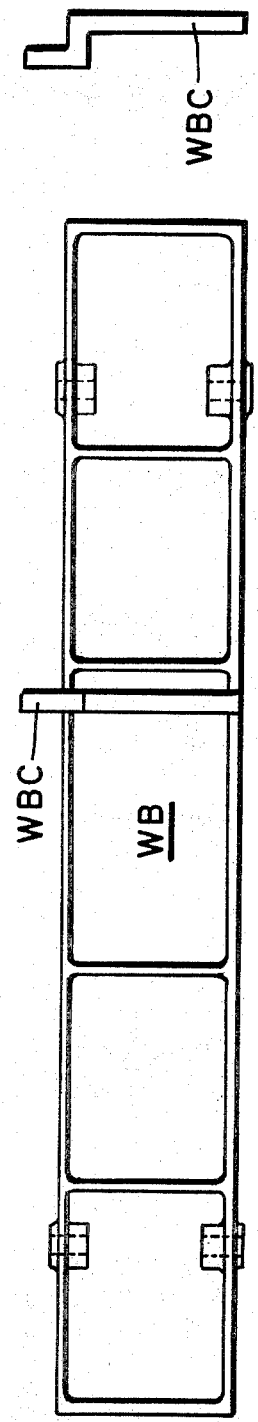
Fig. 8a
Fig. 8
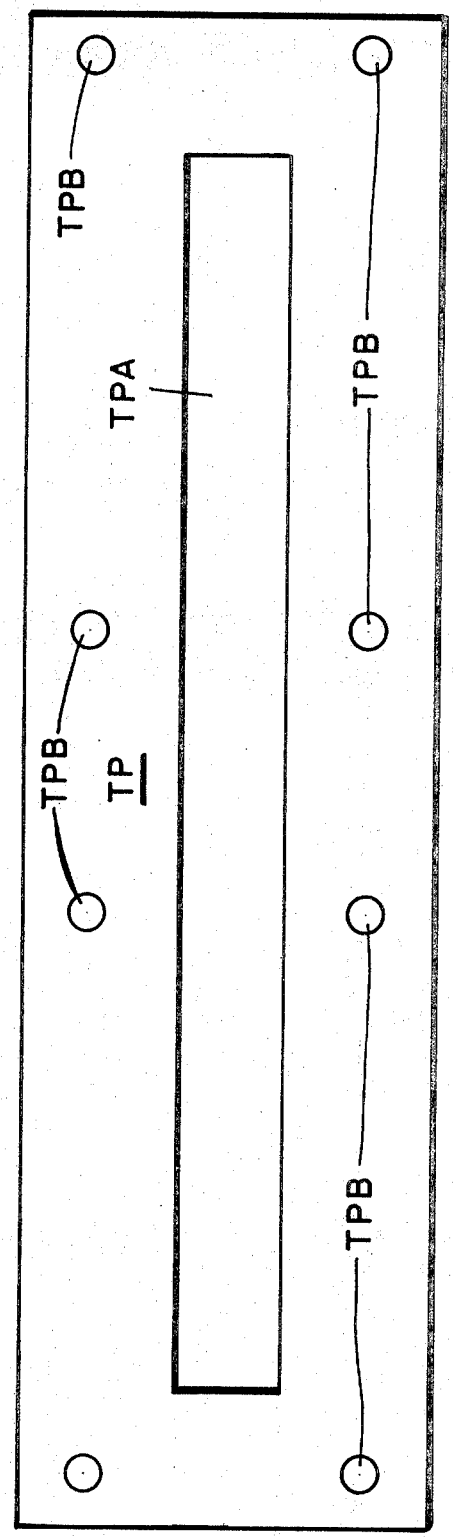
Fig. 9

ARTICLE HANDLING APPARATUS

BACKGROUND OF THE INVENTION

The manual handling of relatively small diameter disk-like articles, such as small lenses or holders therefore for example, involves tedious and relatively time-consuming and, therefore, relatively expensive operations, as is well known. It is desirable, therefore, both for economic reasons and for purposes of mass production of products incorporating disk-like articles of the size mentioned, that such articles be handled automatically, rather than manually, and also be handled at a relatively high rate of speed. Accordingly, the apparatus of the present invention was developed to handle small diameter disk-like articles at a high rate of speed and with relatively high precision where such articles are, for example, lenses which are to be precisely inserted in holders or frames therefor during assembly operations.

It is a second object of the invention to disclose means for mass transferring relatively small disk-like articles between machines for performing operations thereon or between different plants where different ones of such operations are performed, such transfers being made without manual handling of the individual articles and, therefore, with lower risk of contamination of such articles while attaining transfers of plurality of the articles in mass.

Other objects and characteristic features of the invention will become apparent as the description proceeds.

BRIEF SUMMARY OF THE INVENTION

The invention is believed to be adequately summarized in the foregoing abstract of the disclosure and, therefore, to avoid repetition and redundancy, as well as to shorten the specification to the extent practicable, no further summary of the invention is believed necessary nor will any be given.

BRIEF DESCRIPTION OF THE DRAWINGS

In the drawings:

FIGS. 3a and 3b are enlarged top plan views and cross-sectional views, respectively, of a small part of the apparatus shown in FIGS. 1 and 3;

FIGS. 7, 8, 8a, 9 and 15 are detail views of parts of the apparatus of the invention shown in one or more of the above drawing FIGS. 1 through 6.

Similar reference characters refer to similar parts in each of the FIGS. of the drawings.

PREFERRED EMBODIMENTS OF THE INVENTION

Before describing the apparatus of the drawings in detail, it is believed expedient to briefly discuss FIGS. 20 through 23 of the drawings by themselves and in conjunction with FIGS. 22 through 30 of the drawings as set forth below.

Figure 20:
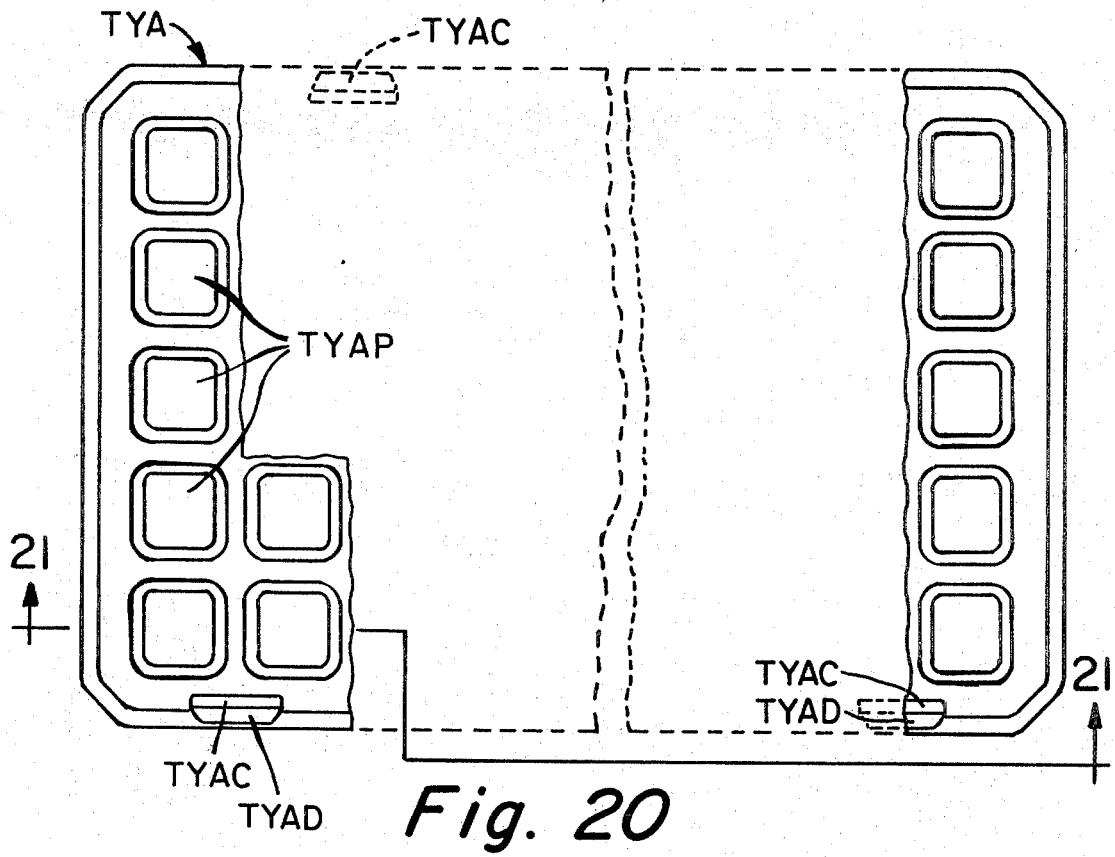
FIG. 20 illustrates, on an enlarged scale, one type of an article holding tray which may be used in conjunction with the apparatus of the invention.
Figure 21:
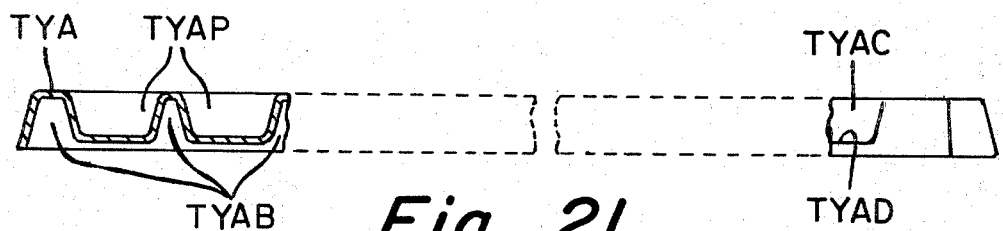
FIG. 21 is a partially cross-sectional and partly elevational view of the tray of FIG. 20, such view being taken generally along line 21—21 of FIG. 20.
Figure 28:
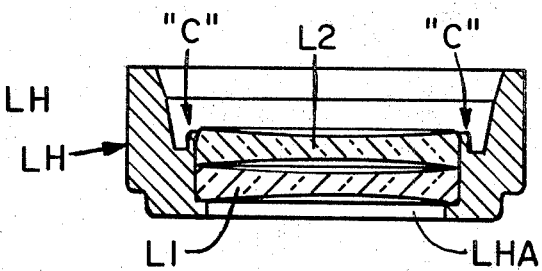
Figure 29:
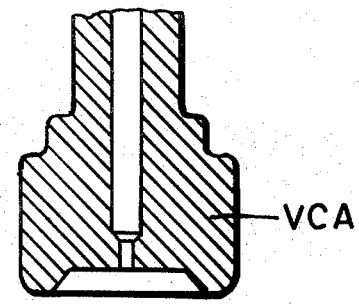
FIG. 29 is an axial cross-sectional view of one type of vacuum chuck which may be used in the apparatus of the invention for handling each of said two other types of disk-like articles of FIG. 26.

Referring to FIGS. 20 and 21 of the drawings there is shown a tray TYA formed of a sheet of relatively thin plastic material and embodying in the upper surface thereof a plurality of similar pockets such as TYAP arranged in equally spaced apart rows of five pockets each and also in equally spaced apart columns each comprising, for the purpose of the specific detailed example or description of the invention hereinafter set forth, a plurality of ten pockets each. The lower part of tray TYA is open for access to or entrance into spaces such as TYAB (FIG. 21) between adjoining rows of pockets, and between the ends of the tray and the first and last rows of pockets, as hereinafter discussed. Tray TYA also embodies in each of the sides of the tray an equally spaced apart series of relatively deep indentations such as TYAC, there being a series of five such indentations along one side of the tray and a series of only four of the indentations along the other side of the tray. Thus the indentations on opposite sides of the tray are stagggered from each other across the width of the tray and, when, a plurality or succession of trays such as TYA are disposed one above the other to form a stack thereof and with the sides of each succeeding tray turned opposite to the sides of each immediately succeeding tray, if any, the succession of trays are nested to a very limited extent, such extent being limited by the bottoms of ledge portions such as TYAD (FIG. 21) of each indentation such as TYAC in a tray coming to rest on a portion or region of the top surface of another tray, such portion or region being adjacent the outer perimeter of each tray disposed immediately below another tray, as will be readily apparent to those skilled in the art. Such a nesting arrangement is provided to attain a certain degree of stability in a stack of trays during manual handling thereof and without the trays of a stack becoming nested to such a degree that they cannot be readily separated or unnested from one another. The bottoms of the pockets, such as TYAP in a tray such as TYA, each have perimetric configuration such that a relatively small diameter disk-like article, such as LH shown in FIGS. 24 and 25 of the drawings, or an assembly or combination of three articles such as shown in FIG. 28 of the drawings, can rest in each said pocket in a relatively snug relationship therewith but, also, be readily removable therefrom. The purpose of such arrangement will become apparent as the description proceeds.

Figure 22:
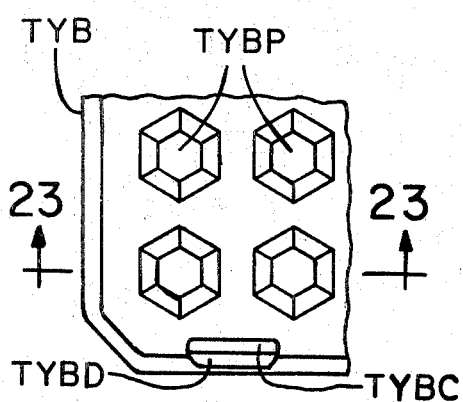
FIG. 22 is a view similar to FIG. 20 and illustrating, on an enlarged scale, another or second type of an article holding tray which may be used in conjunction with the apparatus of the invention.
Figure 23:
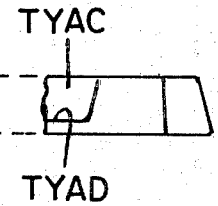
FIG. 23 is a view similar to FIG. 21 but taken generally along line 23—23 of FIG. 22.
Figure 24:
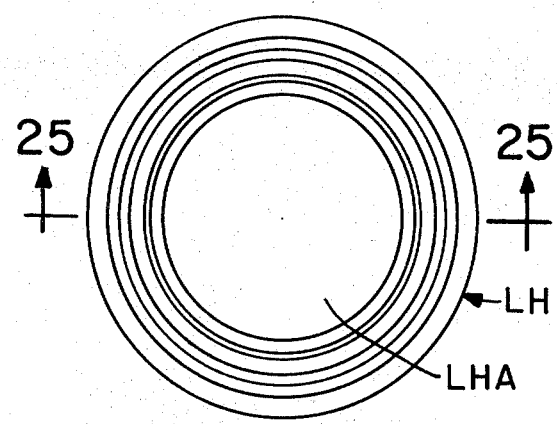
FIG. 24 is a top plan view, on an enlarged scale, of one type of disk-like article which the apparatus of the invention is intended to handle.
Figure 25:
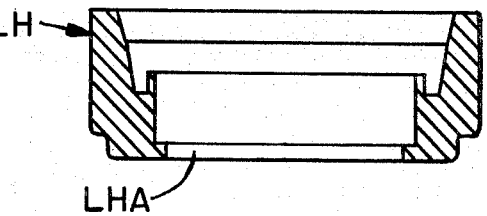
FIG. 25 is a cross-sectional view of the article of FIG. 24, such view being taken generally along line 25—25 of FIG. 24.

Now referring in detail to a tray such as TYB, shown in FIGS. 22 and 23 of the drawings, such tray embodies a plurality of rows and columns of pockets such as TYBP which correspond to the pockets such as TYAP in tray TYA. However, the pockets such as TYPB in a tray such as TYB each have an inner perimetric configuration such that a relatively small diameter disk-like article such as L1 or L2, shown in FIG. 26 of the drawings and to be hereinafter discussed, can rest in each said pocket in a relatively snug relationship therewith but, also, readily removable therefrom. The other above-discussed features of tray TYA also correspondingly apply to tray TYB and the spaces TYBB, and the indentations such as TYBC and their ledge portions such as TYBD shown in FIGS. 22 and 23, correspond to and are intended to serve the same purpose as the spaces TYAB, and the indentations such as TYAC and their ledge portions such as TYAD, respectively, shown in FIGS. 20 and 21.

Figure 30:
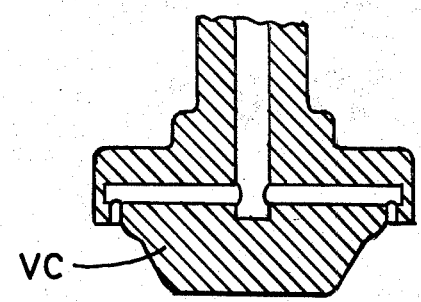
FIG. 30 is an axial cross-sectional view, on an enlarged scale, of a type of vacuum chuck used in the apparatus of the invention for handling a disk-like article such as shown in FIGS. 24 and 25.

Referring to FIG. 30, there is shown, as previously mentioned, an axial cross-sectional view of a vacuum chuck VC which can be used on the disclosed apparatus for handling the aforementioned disk-like articles such as LH shown in FIGS. 24 through 28. Since such articles each have a bottom opening LHA therein, a special type of vacuum chuck such as VC is required for picking up and holding articles such as LH for transfer thereof. As also previously mentioned, with reference to FIG. 29 of the drawings, there is shown in such drawing figure an axial cross-sectional view of a vacuum chuck VCA which can be used on the disclosed apparatus for handling the aforementioned disk-like articles such as L1 and L2 shown in FIGS. 26, 27 and 28 of the drawings.

Figure 27:
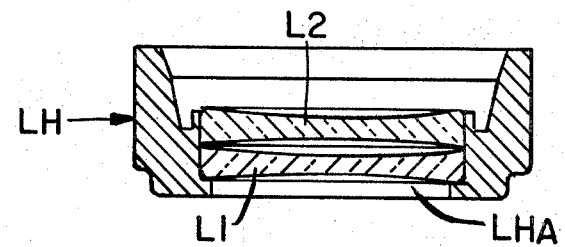
FIGS. 27 and 28 are cross-sectional views illustrating, also for the purpose of pointing out the utility of the invention, two additional steps in completing the assemblying of said combination of articles.
Figure 26:
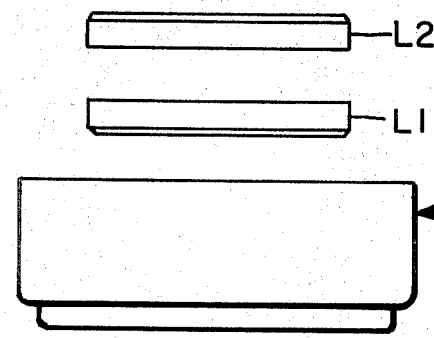
FIG. 26 is an elevational view of the disk-like article of FIG. 24 and includes, on an enlarged scale, elevational views of the two other types of disk-like articles for the handling of which the apparatus of the invention may be employed, such view also illustrating for the purpose of pointing out the utility of the invention, steps in assembling a combination of three such articles.

In the previously mentioned assembling of a combination of three articles, four sets of apparatus such as disclosed herein may be provided adjacent to and about the outside of the periphery of a rotatable turret of a turret type machine which intermittently moves or steps each of a succession of nests, on the top surface of the turret of such machine, to and from each of a series of work stations in a path of rotation of the machine turret. A first set of said four sets of apparatus may be located at a first of said work stations and may include a row or gang of vacuum chucks, such as VC shown in FIG. 30, and be used for successively transferring rows of disk-like articles such as LH (FIGS. 24 through 28) each having, for example, a diameter of about 0.875 inch or less, from successive rows of the pockets such as TYAP in a tray such as TYA (FIGS. 20 and 21) to suitable means for further transferring each said transferred article to each of said nests on said machine turret as each respective nest is presented at said first work station in said path of rotation of the machine turret. Similarly, at each of second and third selected work stations in said path of rotation of the turret machine, second and third sets of said four sets of apparatus may be located at such second and third selected work stations, respectively, and each such set of apparatus may include a row or gang of vacuum chucks such as VCA shown in FIG. 29 and be used for successively transferring rows of disk-like articles such as L1 and L2 (FIGS. 26, 27 and 28) each having, for example, a diameter of about 0.625 inch, or less, respectively, from successive rows of the pockets such as TYBP in first and second pluralities of trays such as TYB handled by each of said second and third sets of apparatus, respectively. Such transfers of articles are also made to suitable means, at said second and third stations, for further transferring each said transferred article to a disk-like article such as LH as each of the latter articles is presented to each of said selected second and third work stations by said turret of the turret machine. A pair of articles such as L1 and L2 may thus be sequentially inserted, as illustrated in FIG. 26, in the hollow of each article such as LH as each article LH is sequentially presented to said selected second and third work stations, respectively. The articles or holders such as LH, with a pair of articles such as L1 and L2 inserted therein as shown in FIG. 27, may be sequentially subsequently transferred by the turret machine to another work station where an internal lip part of each respective holder LH is crimped over the upper rim of the upper article such as L2 in such holder as indicated by the letters "C" in FIG. 28. This is done, of course, to retain the articles such as L1 and L2 in each respective article, such as LH, holding such a pair of articles.

There may be located, at an article or assembly take-out station in the path of rotation of the turret of said turret machine, the aforesaid fourth set of apparatus such as disclosed herein and such apparatus would be, as hereinafter further discussed, arranged to transfer a sequence of assembled combinations of articles such as shown in FIG. 28 to rows of pockets such as TYAP in trays such as TYA. In other words, at said take-out station, the apparatus of the invention would be arranged to operate in a manner reverse to the operation of the first three sets of such apparatus as briefly discussed above. This will be further discussed hereinafter.

DETAILED STRUCTURAL DESCRIPTION OF THE INVENTION

Figure 1:
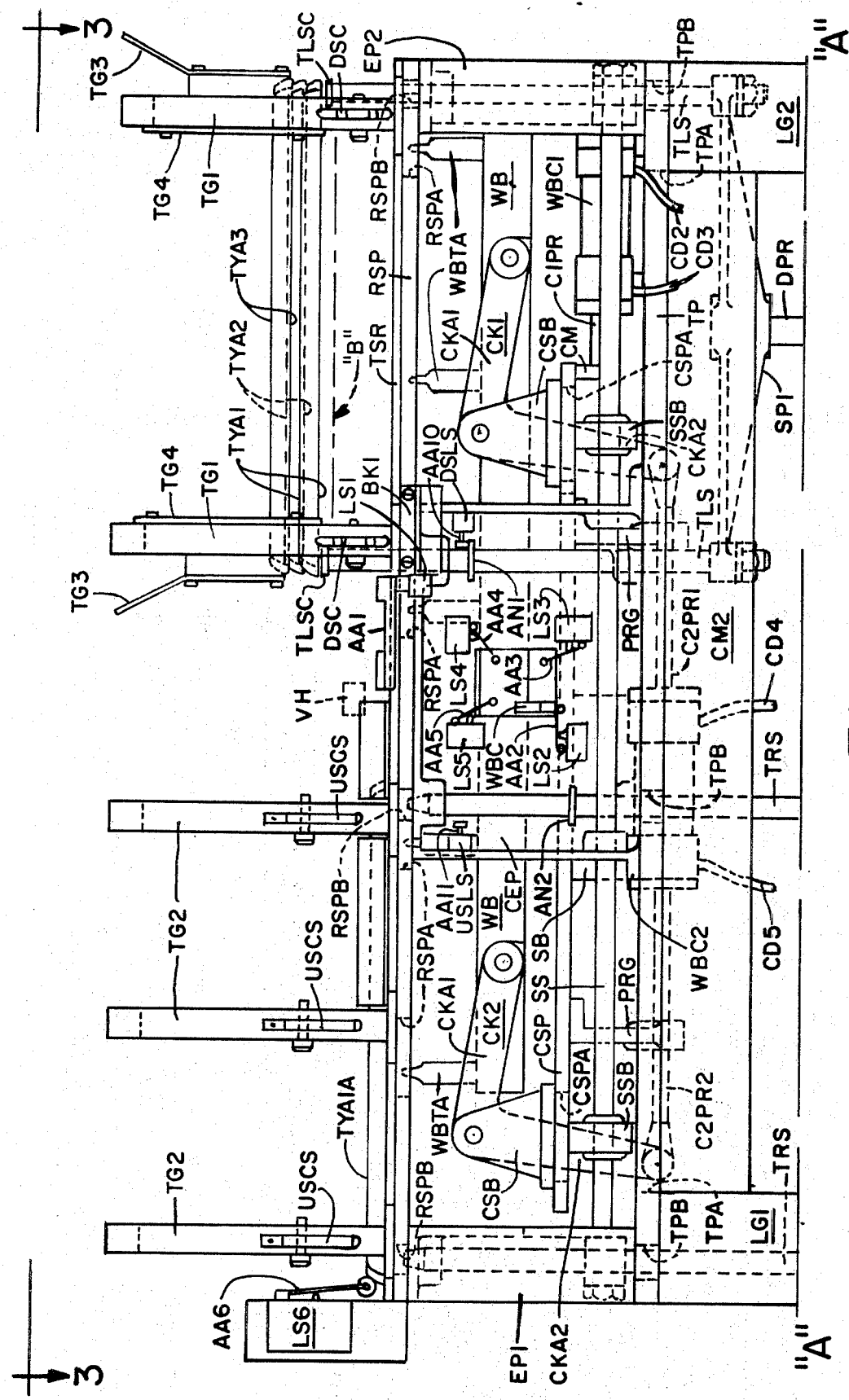
FIGS. 1 and 2, when arranged with lines A — A in each such drawing figure abutting or coinciding with each other, comprise a front elevational view of a main part of the apparatus of the invention.
Figure 2:
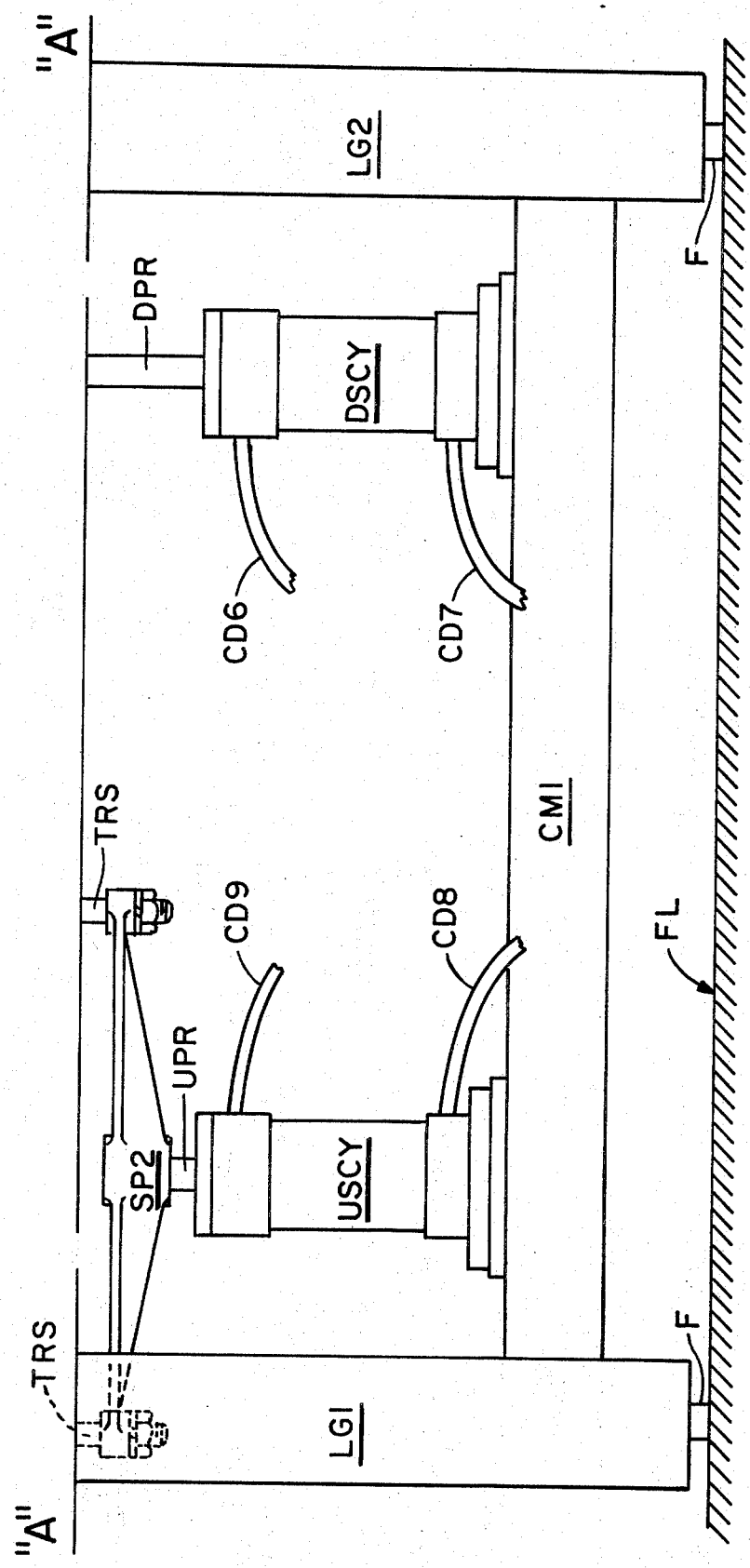
Figure 3:
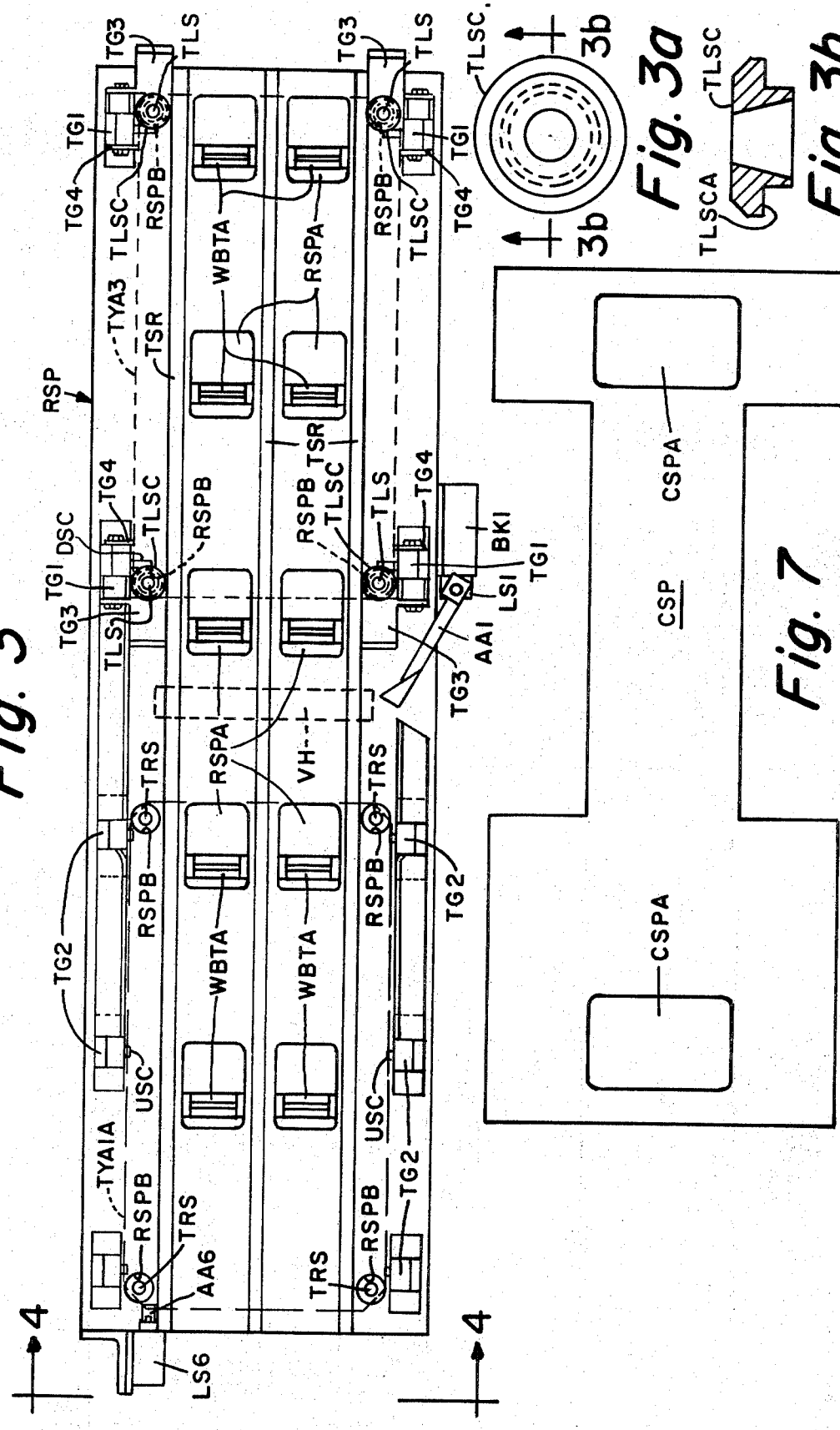
FIG. 3 is a top plan view of the apparatus of FIG. 2, such view being taken generally along line 3—3 of FIG. 2.
Figure 4:
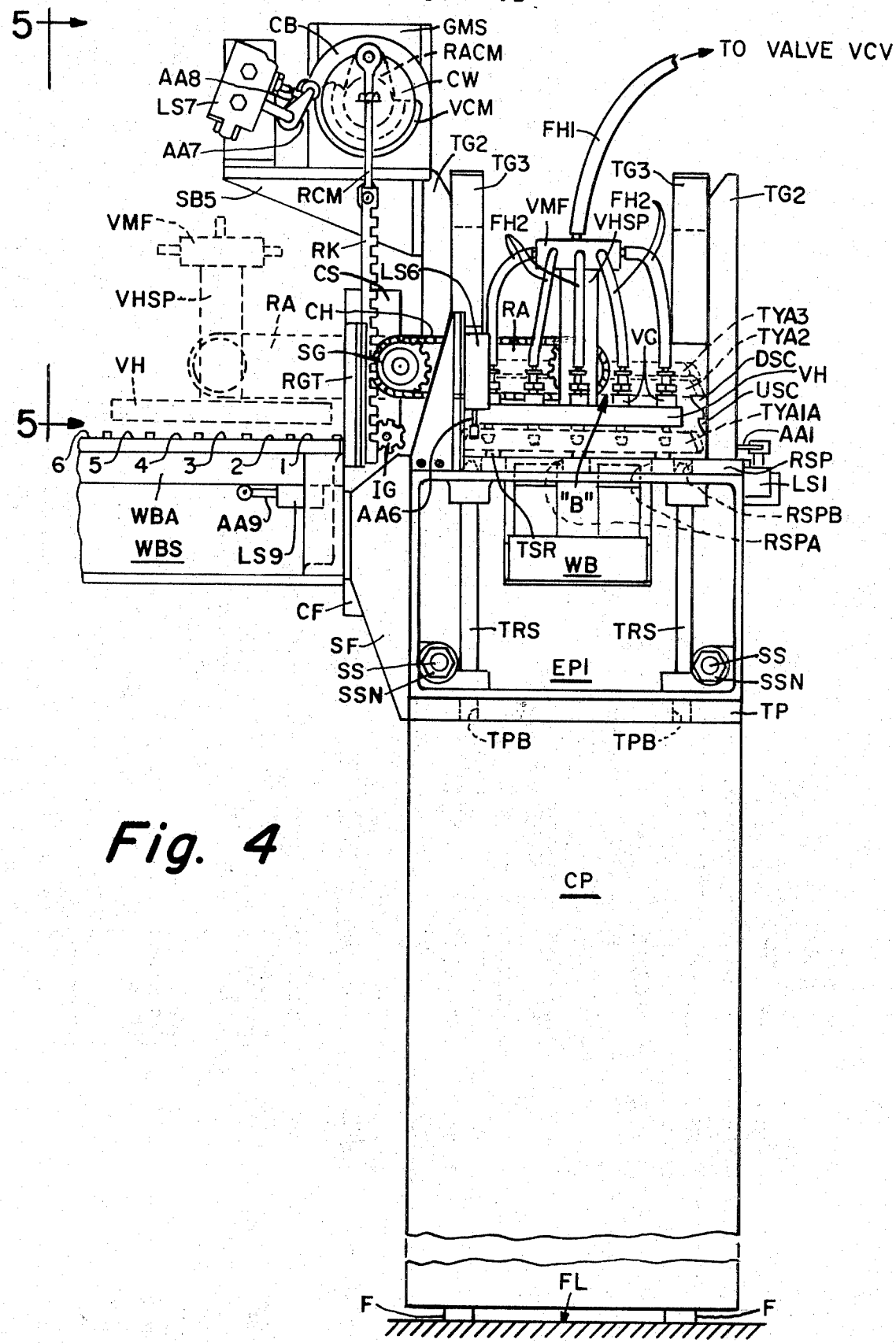
FIG. 4 is a view of the right hand end of the apparatus of FIGS. 1 and 2, and also embodies an end view of another main part of the apparatus of the invention.

Now referring in detail to FIGS. 1 and 2 with said drawings abutting each other along lines A — A thereof and taken in conjunction with FIGS. 3 and 4 of the drawings, there is shown an apparatus support frame including legs such as LG and cross members such as CM1 and CM2, such frame supporting on its upper end a top plate TP having a planar configuration such as shown in detail in FIG. 9. The bottoms of the legs such as LG1 and LG2 include feet such as F each of which rest on a floor or the top surface of a suitable support platform FL shown in the usual manner in FIGS. 2 and 4. A cover plate CP covers the end of said support frame shown in FIG. 4 and, therefore, the legs of such platform are not shown in such figure of the drawings. First and second recessed end plates or spacers EP1 and EP2 are provided at the left and right hand ends (viewing FIG. 1) of top plate TP and are secured to the top surface of such plate adjacent said ends thereof in any convenient manner. Similarly, a pair of recessed center plates or spacers such as CEP are secured to the top surface of plate TP adjacent the front and rear edges of plate TP but with only the front center plate of such pair being shown (FIG. 1) for purposes of simplification of the drawings, it being pointed out that such pair of plates are identical to each other with the rear one of such plates being, of course, reversed in relation to the front one of such plates.

Figure 15:
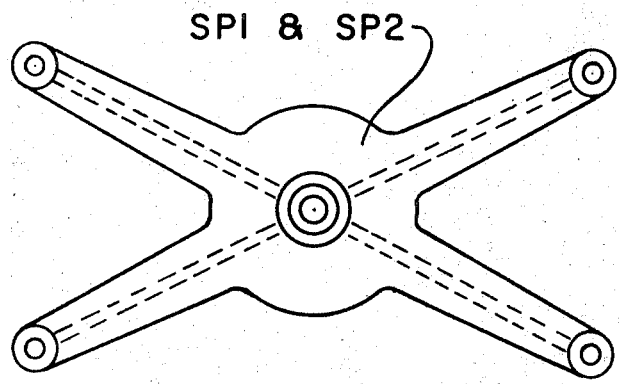

There is secured to the top surface of cross member CM1 (FIG. 2) the lower ends of a pair of vertically disposed and so-called up-stacker and down-stacker motor means or pressurized fluid cylinders USCY and DSCY, respectively. The upper and otherwise free ends of piston rods UPR and DPR, respectively, of such cylinders are secured to the centers of so-called spiders SP1 and SP2, respectively, as shown in FIGS. 1 and 2. See also FIG. 15 for a detail top plan view of the spiders SP1 and SP2. Each such spider includes four outspread or generally horizontally extending arms or legs adjacent the ends of each of which is secured, the lower end of a vertically extending tray lowering shaft such as TLS for said spider SP1 or a tray raising shaft such as TRS for said spider SP2. Such shafts such as TLS and TRS extend upwardly through holes or passages such as TPB embodied in and extending through top plate TP (see also FIG. 9) such shafts being readily vertically movable within their respective such holes or passages in the top plate.

The upper ends of said shafts TLS also extend upwardly through suitable bearings provided in bosses in plates or spacers EP2 and CEP (as well as the plate at the rear of top plate TP and not shown as previously mentioned) and thence through a first set of holes or passages such as RSPB embodied in a tray support plate RSP which is best illustrated in FIG. 3 and which will be hereinafter discussed. The upper end of each of the shafts such as TLS is provided with a cap or cap member such as TLSC shown in detail in FIGS. 3a and 3b of the drawings and, in the normal condition or conditions of rest of the apparatus, shafts TLS are in lowered positions so that lower annular surfaces such as TLSCA (FIG. 3b) of the upper portions of each of the caps rests on or is in close adjacency to the top surface of plate RSP. The upper end of said shafts TRS also extend upwardly through suitable slide bearings provided in bosses in plates or spacers EP1 and CEP (as well as said plate at the rear of top plate TP) and thence through a second set of the holes or passages such as RSPB embodied in said tray support plate RSP. The upper ends of the shafts such as TRS are illustrated in FIGS. 1 and 4 as normally extending, that is, during a condition of rest of the apparatus, extending only partly upward through their respectively associated set of holes such as RSPB.

Figure 16:
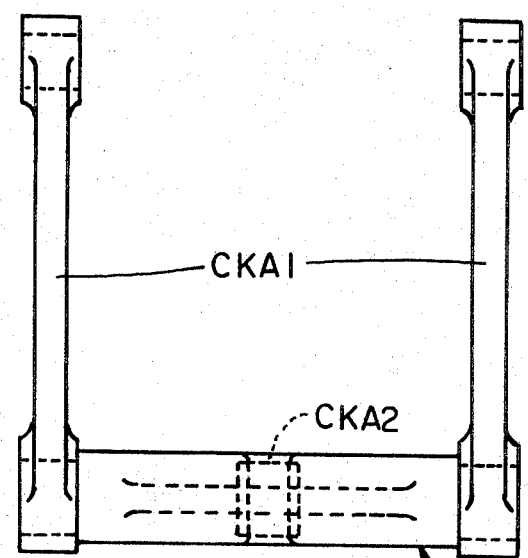
Figure 17:
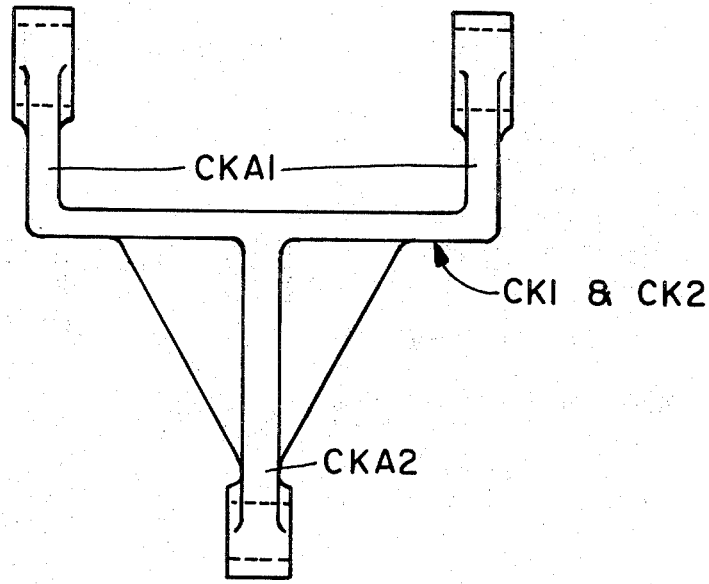

A pair of spaced apart slide shafts such as SS (FIGS. 1 and 4) horizontally extend, in a relatively snug relationship therewith, through suitable bosses provided in said end plates or spacers and EP2, EP1 and said center plates such as CEP, and such shafts are securely held in said bosses as by nuts such as SSN (FIG. 4) screwed over threaded ends of said shafts and tightened, as is well known in the art. A pair of bell cranks such as CK1 and CK2 are provided, each such crank including a first pair of yoke arms such as CKA1 and a single arm such as CKA2 as shown in detail in FIGS. 16 and 17. At the point or line of fulcrum of such cranks the cranks are each pivotally supported (FIG. 1) by a pair of suitable crank support brackets such as CSB, each such pair of bracket being secured to the top surface of a crank support plate CSP of which a detailed top plan view is shown in FIG. 7. Each said pair of brackets such as CSB are secured to said top surface of plate CSP adjacent opposite sides of one of a pair of cut-outs or holes such as CSPA extending through the plate CSP. The crank arms such as CKA2 of the cranks such as CK1 and CK2 each extend downwardly through their respectively associated cut-out or passage such as CSPA and as shown in FIG. 1.

Adjacent the sides of each of the wider portions of crank support plate CSP shown in FIG. 7, there is secured to the bottom surface of such plate the upper ends of a pair of slide and support brackets such as SSB (FIG. 1) the lower portions of such brackets each embodying a suitable slide bearing through which an associated one of the slide shafts such as SS extends in a relatively snug but slidable relationship therewith as will be readily apparent to those skilled in the art. The otherwise free ends of crank arms CKA1 of bell cranks CK1 and CK2 are pivotally connected with the sides of a walking beam WB (FIG. 1) to raise or lower such walking beam when said cranks are rotated about their fulcrums as hereinafter described. A bottom plan view of walking beam WB is shown in FIG. 8 and there is shown in FIGS. 1 and 8 a walking beam cam WBC (FIG. 8a) which is secured to walking beam WB adjacent the lower edges of the sides of such beam and is provided for purposes hereinafter described.

There is also secured to the bottom surface of crank support plate CSP (FIG. 1) the upper ends of a pair of piston rod guides such as PRG whose lower ends are provided with suitable slide bearings through which first and second piston rods C2PR1 and C2PR2 of a pressurized fluid motor or walking beam cylinder WBC2 extend in a relatively snug but slidable relationship therewith. The otherwise free ends of the piston rods C2PR1 and C2PR2 are pivotally connected to the otherwise free ends of crank arms CKA2 of bell cranks CK1 and CK2, respectively, and said cylinder WBC2 is supported, by being secured to the bottom surface of a suitable support bracket SB whose top surface is secured to the lower surface of crank support plate CSP along a longitudinal centerline of such lower surface. Thus, cylinder WBC2 is disposed within a cut-out portion or slot TPA extending through top plate TP (FIG. 9) so as to be longitudinally movable within such slot or cut-out portion as crank support plate CSP is actuated longitudinally as hereinafter discussed. A detailed discussion of the purpose of pressurized fluid motor or cylinder WBC2 and its piston rods C2PR1 and C2PR2 will be given hereinafter in an operational example of the invention.

Another pressurized fluid motor or cylinder WBC1 (FIG. 1) is suitably fixedly supported on the upper surface of top plate TP and has the otherwise free end of its piston rod C1PR secured to the lower end of a downwardly depending connecting member CM whose upper end is secured to the lower surface of crank support plate CSP adjacent the right hand end of such plate (viewing FIG. 1) and preferably at the center of such end of the plate. Thus, longitudinal actuation of piston rod C1PR of cylinder WBC1 will impart longitudinal movement to crank support plate CSP and, thence, to the bell cranks CK1 and CK2 and walking beam WB. This will be discussed in detail hereinafter in an operational example of the invention.

It is pointed out at this point in the description that suitable pressurized fluid conduits CD6 and CD9 (FIGS. 2 and 31) connect to the upper ends of previously discussed cylinders DSCY and USCY, respectively, and similar fluid conduits CD7 and CD8 connect to the lower ends of cylinders DSCY and USCY, respectively, for supplying pressurized fluid to such cylinders for actuation of the respective piston rods thereof as also hereinafter discussed in detail in conjunction with FIG. 31. Similarly, pressurized fluid conduits CD2 and CD3 connect to the right and left hand ends, respectively, of cylinder WBC1 (viewing FIG. 1) to selectively provide pressurized fluid to the ends of such cylinder for longitudinal actuation of piston rod C1PR of such cylinder, and pressurized fluid conduits CD4 and CD5 connect to the right and left hand ends, respectively, of cylinder WBC2 (viewing FIG. 1) to selectively supply pressurized fluid to the ends of such cylinder for longitudinal actuation of piston rods C2PR1 and C2PR2 and, thereby, rotation of bell cranks CK1 and CK2 about their fulcrums. (See also FIG. 31). Such actuations are also discussed in detail hereinafter. The above-mentioned fluid conduits CD4 and CD5 must be flexible conduits or hoses since cylinder WBC2 moves along with crank support plate CSP. However, the other above-mentioned fluid conduits may be relatively rigid pipe or flexible hoses as desired.

There is secured to the upper surface of walking beam WB the lower ends of a plurality of upwardly extending tray actuators such as WBTA (FIGS. 1 and 3) which are projectable or actuable upwardly through respectively associated apertures or cut-outs such as RSPA extending through support plate RSP (FIG. 3). Such actuators WBTA are actuated upwardly and downwardly through their respective said apertures such as RSPA when walking beam WB is correspondingly actuated as hereinafter described in detail. However, under the normal or initial conditions of the apparatus, walking beam WB and, therefore, the tray actuators such as WBTA are in their lowered positions best illustrated in FIG. 1.

Figures 11, 12:
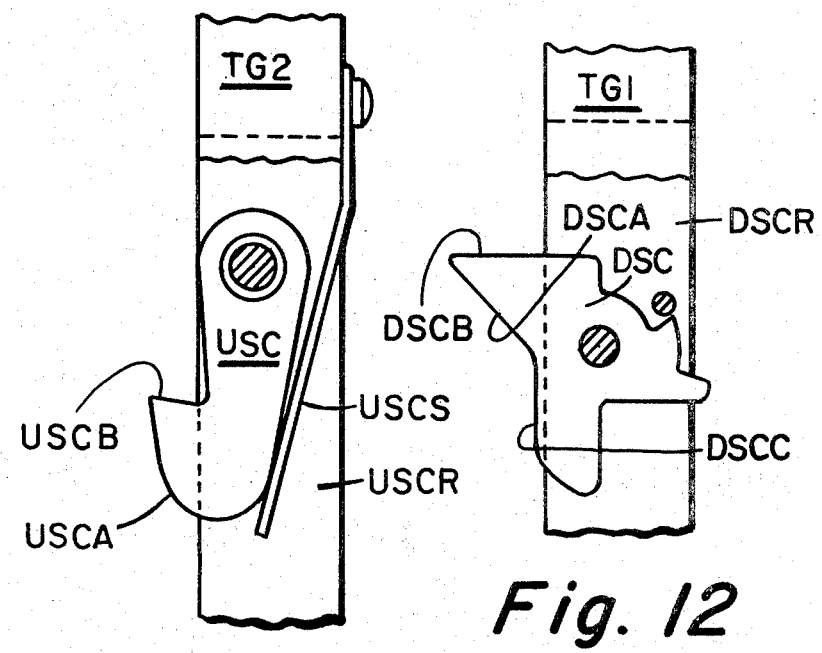
FIGS. 11 through 14 and 16 through 19 are enlarged detail views of parts of the apparatus of the invention shown in one or more of said views 1 through 6.
Figure 13:
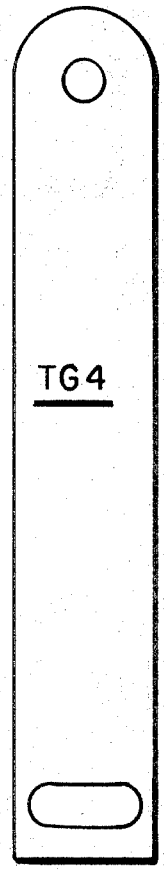
Figure 14:
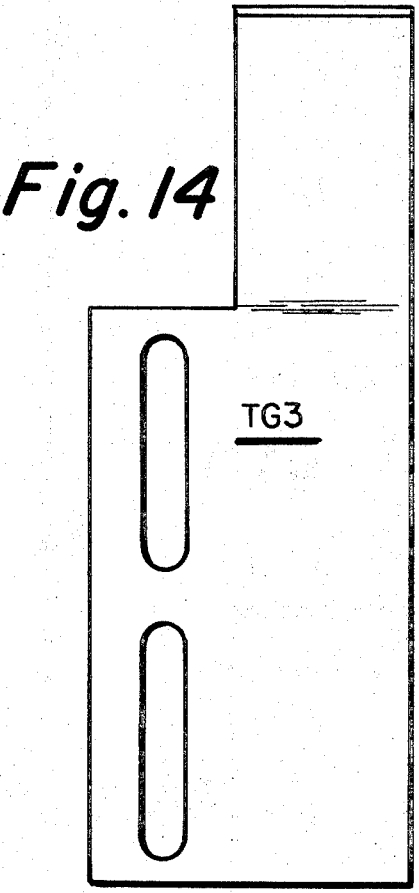

There is secured to the top surface of support plate RSP a plurality of three longitudinal and equally spaced apart rails such as TSR upon which trays, such as TYA and handled by the apparatus, rest when the trays are in their lowered positions as hereinafter discussed in detail. There is also secured to the upper surface of support plate RSP, adjacent the sides of such support plate, lower or footed ends of a first plurality of upwardly extending tray guides such as TG1 (FIGS. 1, 3 and 5) and lower or footed ends of a second plurality of tray guides such as TG2 (FIGS. 1, 3 and 4). Reference is also made to FIGS. 11 and 12 for detailed views of portions of said tray guides TG2 and TG1, respectively, and it is pointed out that each tray guide such as TG1 pivotally supports in a suitable recess or vertical slot, such as DSCR in the respective guide, a so-called (tray) down-stacker cam DSC hereinafter discussed in further detail. Each such cam is normally maintained in its rotational position shown in FIG. 12, by the force of gravity. Similarly, each tray guide such as TG2 pivotally supports in a suitable recess or vertical slot, such as USCR in the respective guide, a so-called (tray) upstacker cam USC hereinafter discussed in further detail. Each such cam is normally maintained in its rotational position shown in FIG. 11 by a leaf spring such as USCS attached at the upper end thereof to the respective tray guide such as TG2 and bearing near its lower end against a selected part of the back edge of the respective cam USC to spring bias each cam to the position shown. Of course, the force of gravity causes each such cam such as USC to normally depend from its pivot so that said selected part of the back edge thereof normally contacts its associated spring near the lower end thereof as mentioned above. There is also attached to the sides of each of the tray guides such as TG1 a tray guide such as TG3 and a tray guide such as TG4 (FIGS. 1, 3, 4 and 5) which aid, along with tray guides such as TG1, in maintaining the outer peripheral rims of a stack of trays such as TYA1, TYA2 and TYA3 in a relatively precise vertical alignment with each other.

A plurality of electrical circuit controlling limit switches LS1 through LS6, and DSLS and USLS, are shown in one or more of FIGS. 1, 3 and 4 of the drawings and such switches include actuating arms AA1 through AA6, and AA10 and AA11, respectively. Limit switch LS1 is secured to a bracket BK1 which is in turn secured to the front edge or side (viewing FIG. 1) of support plate RSP and the actuating arm AA1 of such switch extends above or over a portion of the top surface of plate RSP so as to be actuated by the leading edge and a side edge of a tray such as TYA as such tray is moved from the right hand end of the apparatus (viewing FIG. 1) towards the left hand end thereof as hereinafter described. Limit switches LS2 through LS5 are secured within and at the rear of the recessed portion of front center plate or spacer CEP, as shown in a region of the center of the apparatus of FIG. 1, and the actuating arms AA2 through AA5 thereof are sequentially actuated, as hereinafter set forth in detail, by the previously mentioned walking beam cam WBC secured to walking beam WB. Limit switches DSLS and USLS are also secured within and at the rear of said recess in plate CEP and are positioned therein so that actuating arm AA10 of the down-stacker limit switch DSLS is actuated by the upper surface of an annulus or ring-like member AN1 which surrounds, in a peripheral region thereof, the centermost front tray lowering shaft TLS, such actuation of arm AA10 occurring when such shaft nears the end of each of its aforementioned upward strokes or actuations described hereinafter in more detail. Similarly, actuating arm AA11 of up-stacker limit switch USLS is actuated by the upper surface of an annulus or ring-like member AN2 which surrounds, in a peripheral region thereof, the centermost front tray raising shaft TRS, such actuation of arm AA11 occurring when such shaft nears the end of each of its aforementioned upward strokes or actuations also described hereinafter in more detail. Limit switch LS6 is supported by a suitable bracket secured to the edge of the left hand end of support plate RSP (viewing FIGS. 1 and 3) and is positioned so that actuating arm AA6 of such switch will be actuated by the leading edge of each tray such as TYA transferred and reaching the end of plate RSP. (See, for example, tray TYA1A shown in FIGS. 1 and 3). The electrical circuit controlling contacts of said limit switches and the actuation of such contacts are described hereinafter.

Figure 5:
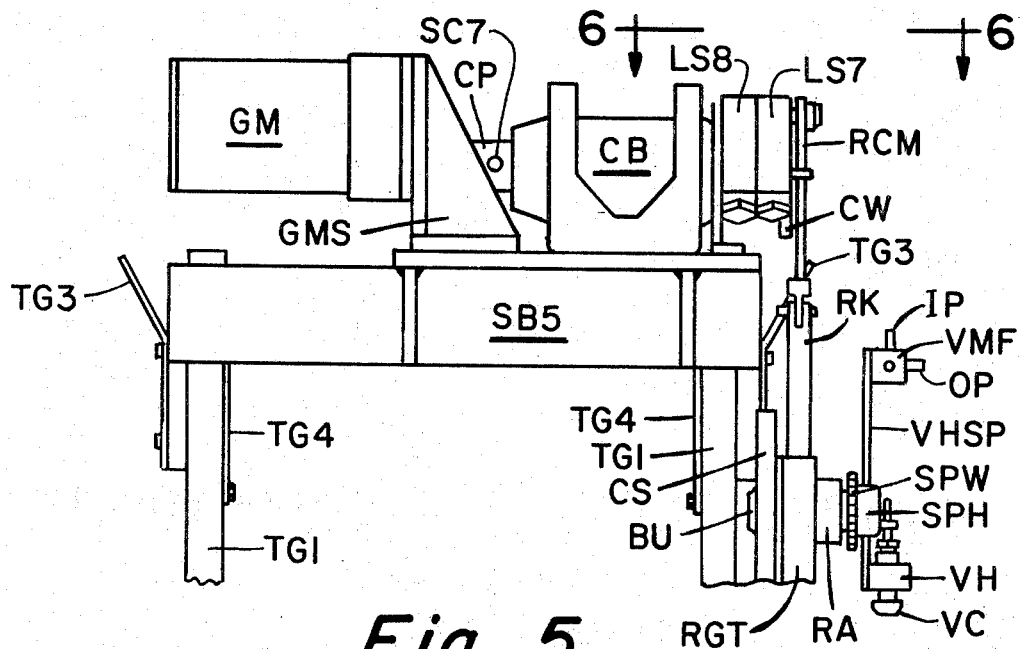
FIG. 5 is a side view of said other main part of the apparatus of the invention shown in FIG. 4, such view being taken generally along line 5—5 of FIG. 4.
Figure 6:
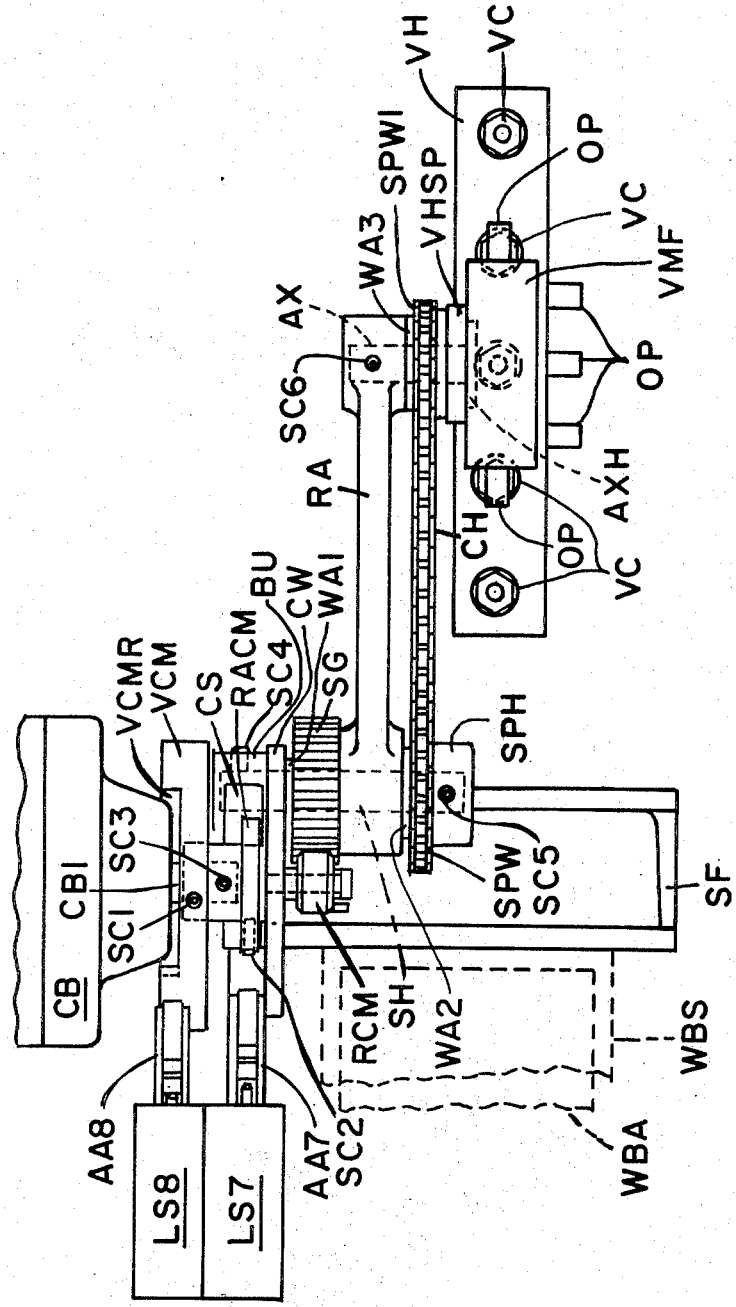
FIG. 6 is a top plan view of part of the apparatus of FIG. 5, such view being taken generally along line 6—6 of FIG. 5.
Figure 10:
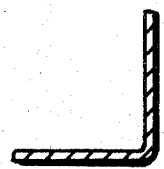
FIG. 10 comprises a cross-sectional detail view, on an enlarged scale, of a small part of the apparatus of the invention.
Figure 18:
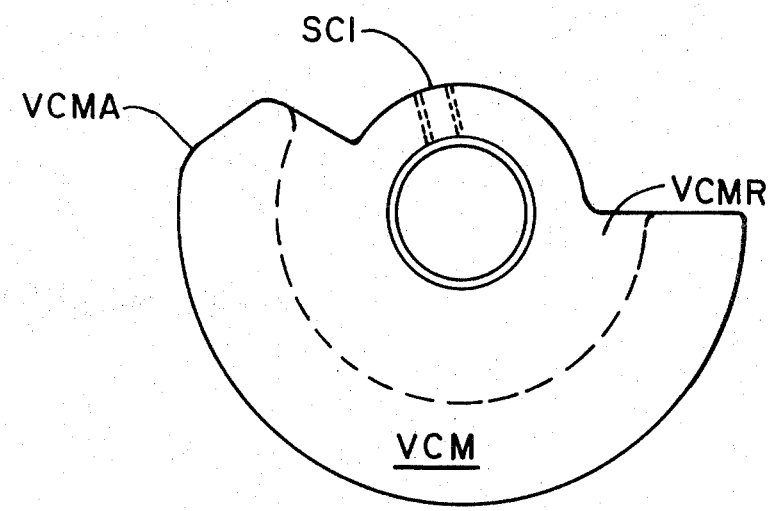
Figure 19:
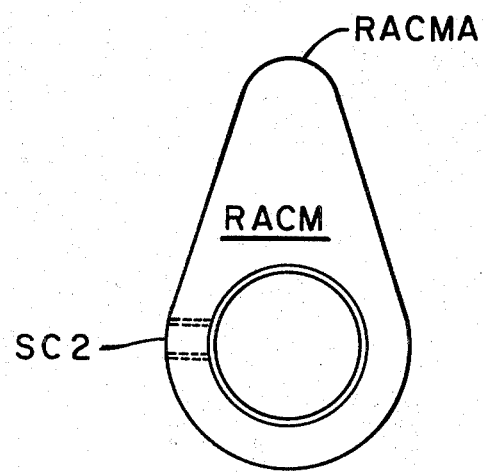

Referring now, in detail, to FIGS. 4, 5 and 6 fo the drawings, taken in conjunction with FIGS. 1 and 3, a support bracket SB5 is secured to the rear sides or backs (left hand sides viewing FIG. 4) of the aforementioned tray guides such as TG1 and such bracket has fastened to and supported on the upper surface thereof a support GMS for an electric gear motor GM whose output shaft is connected, through a suitable coupling CP (FIG. 5) which is keyed to the input shaft of a clutch-brake CB by a set screw SC7, and which clutch brake is also supported on and secured to the upper surface of bracket SB5. Output shaft CB1 of clutch-brake CB has keyed thereto, as by a set screw SC3 (FIG. 6) a hub portion of a crank wheel CW, and there is keyed to such hub portion of the crank wheel, as by a set screw SC1 a cam VCM embodying a recess VCMR into which the end of clutch brake CB extends (FIG. 6). There is also keyed to the hub portion of crank wheel CW, as by a set screw SC2, a so-called point cam RACM, and said cams VCM and RACM, as well as crank wheel CW, are rotated in unison with said output shaft CB1 of clutch brake CB as hereinafter described. Said cams VCM and RACM are shown in detail in FIGS. 18 and 19, respectively, and such cams actuate actuating arms AA8 and AA7 of limit switches LS8 and LS7, respectively, for the purposes discussed below. Electric circuit controlling controls of the above mentioned limit switch LS8 control, as hereinafter discussed, a supply of vacuum or negative pressure to a vacuum manifold VMF and thence to a row or gang of vacuum chucks such as VC previously mentioned and supported by a vacuum head VH; such parts VMF, VC and VH being further discussed hereinafter. Electric circuit controlling contacts of above mentioned limit switch LS7 control, as also hereinafter discussed, an electrical energizing or control circuit for above mentioned clutch-brake CB which also has connected thereto another electrical energizing or control circuit also discussed hereinafter.

Said crank wheel CW has pivotally connected to the outer face thereof (FIGS. 4, 5 and 6) the upper end of a connecting arm or member RCM whose lower end is pivotally connected to the upper end of a toothed rack RK of a rack and gear arrangement, including such rack, a toothed pinion or spur gear SG, an idler toothed gear IG (FIGS. 4 and 6) and a suitable rack guide or slide track RGT (FIGS. 4 and 5) which is suitably attached to a composite support plate CS adjacent the upper end of such support plate. Such plate CS is attached to a support frame SF (FIGS. 4 and 6) and plate CS also fixedly supports near its upper end a bearing or bushing BU (FIG. 6) into which extends one end of an axle or shaft SH and which is keyed to such bushing or bearing by a set screw SC4, such axle or shaft, thereby, being a fixed or non-rotating axle or shaft. Said spur gear SG is disposed on said fixed shaft SH and is freely rotatable thereon. Suitable washers such as WA1 are also disposed between the facing faces of bushing or bearing BU and of spur bear SG. A first end of a rocker arm RA, to be hereinafter discussed, is next disposed on said shaft and is also rotatable thereon but is suitably keyed to the second face of spur gear SG for rotation with such spur gear as hereinafter discussed. Suitable washers such as WA2 are next disposed on shaft SH and a sprocket wheel SPW having a hub portion SPH is then disposed on fixed shaft SH and such sprocket wheel is affixed or keyed to such shaft as by a suitable set screw SC5. By such arrangement, it will be apparent that spur gear SG is rotatable on shaft SH and rocker arm RA, being keyed to such spur gear as mentioned above, would be moved in conjunction with such gear when the gear is actuated by rack RK being actuated up and down by crank wheel CW, as hereinafter discussed in detail.

There is immovably keyed in the second end of rocker arm RA, as by a suitable set screw SC6 (FIG. 6) a shaft end of an axle AX whose second end is provided with a head AXH. However, before inserting said shaft end of axle AX in said second end of rocker arm RA, there is rotatably disposed on said shaft end of axle AX and, in an order moving from said headed portion of said axle along such shaft thereof and towards said shaft end of the axle, a vertical extending vacuum head support plate VHSP which immovably supports, adjacent its upper end, the previously mentioned vacuum manifold VMF and, adjacent its lower end, the previously mentioned vacuum head VH and the row or gang of vacuum chucks such as VC supported by the vacuum head, a sprocket wheel SPW1 which is keyed to said support plate VHSP, and one or more washers such as WA3. The shaft end of axle AX is then inserted in the second end of rocker arm RA and is keyed thereto as mentioned above. A link chain CH loops about the teeth of previously mentioned sprocket wheel SPW and thence extends to sprocket wheel SPW1 to loop about the teeth of that sprocket wheel. Such arrangements as those just described are well known in the art and, when rocker arm RA is reciprocatively actuated through a vertical 180° arc of travel or portions of such an arc as hereinafter discussed, vacuum manifold VMF and vacuum head VH are correspondingly moved while being maintained in their horizontal orientations, shown in FIGS. 4, 5 and 6, by said link chain CH looped about the teeth of said sprocket wheels. Such operation is also well known to those skilled in the art.

Referring further to FIG. 4, the lower ends of each of a plurality of flexible hoses or conduits such as FH2 is connected to the upper end of a respectively associated one of the vacuum chucks, such as VC, of the row or gang of such chucks supported by vacuum head VH, the hoses such as FH2 being shown only in FIG. 4 of the drawings for purposes of clarity and simplification of the drawings. The upper ends of the hoses or conduits such as FH2 are each connected to an outlet port or nipple such as OP (FIGS. 4, 5 and 6) of vacuum manifold VMF, and a first end of a flexible hose or conduit FH1 is connected to an inlet port IP (FIG. 5) of said manifold for the purpose of supplying vacuum or negative pressure to the manifold and, thence, to the vacuum chucks such as VC. This will be further discussed in conjunction with a detailed discussion of FIG. 31 of the drawings.

The aforementioned support frame SF (FIGS. 4 and 6) is fastened to the rear of the apparatus shown in FIGS. 1 and 3 (left hand side of such apparatus as illustrated in FIGS. 4 and 6) and there is also illustrated in FIGS. 4 and 6 a walking beam conveyor WBA supported on the upper surface of a support means WBS, and an electric circuit controlling limit switch LS9 whose actuating arm AA9 is actuated by said conveyor. The electric circuit controlling contacts of limit switch LS9 are shown in FIG. 31 and the purpose of switch LS9 will be pointed out hereinafter in conjunction with a discussion of FIG. 31. The walking beam conveyor WBA and its support means WBS, as further pointed out hereinafter, do not, per se, form a part of the present invention. Conveyor WBA, support means WBS, and limit switch LS9 are considered to be located at an article delivery location as hereinafter discussed and the upper surface of the support means WBS includes a plurality of recesses 1 through 6 (FIG. 4) each of which is intended to hold a disk-like article as also hereinafter discussed.

Figure 31:
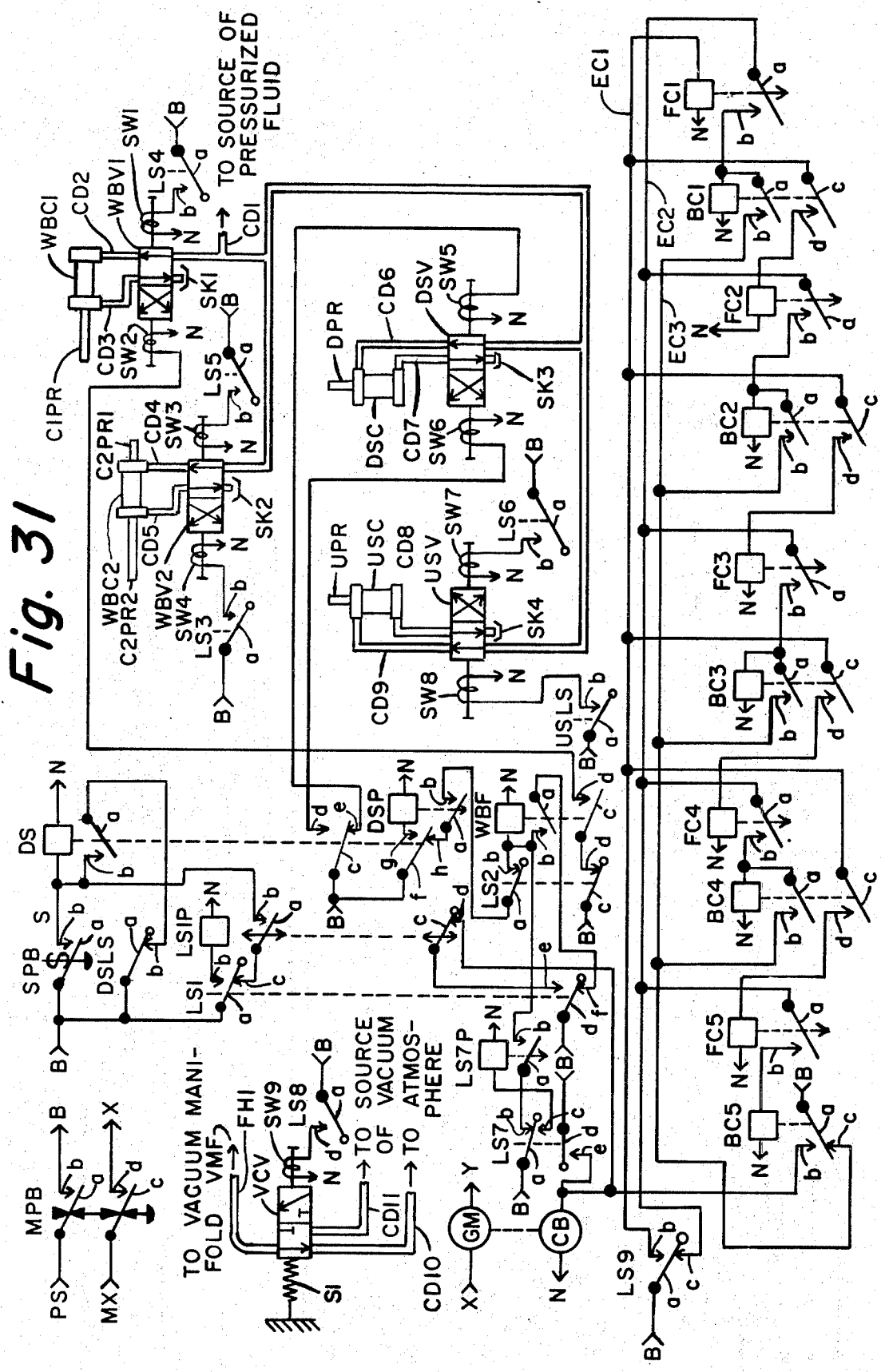
FIG. 31 is a pneumatic and electrical schematic drawing showing one form of a control system for the apparatus of the present invention.

For purposes of simplification of the drawings and brevity, to the extent possible, of the description of the control system covered by FIG. 31 of the drawings, and without sacrifice of a ready understanding of the system controlling the apparatus of the invention, the following expedients are employed to attain said brevity and simplification.

The circuit controlling sets of contacts of the limit switches LS1 through LS9, previously mentioned, are shown only in FIG. 31, and switches LS1 and LS9 are spring biased to normally close their sets of contacts a–c and d–f, and a–c, respectively, as shown in FIG. 1. Such sets of contacts are actuated to open and the sets of contacts a–b and d–e of switch LS1, and a–b of switch LS9, are actuated to close when operations of the respective limit switches occur as hereinafter discussed. Switch LS2 is spring biased to open its sets of circuit controlling contacts a–b and c–d but, in the normal condition of the apparatus of the invention, such sets of contacts are maintained closed by walking beam cam WBC maintaining actuating arm AA2 of the switch in an actuated condition. Switches LS3 through Ls6, LS8, and USLS are spring biased to normally open their sets of contacts a–b, such contacts being actuated to close as hereinafter discussed. Switch LS7 is spring biased to close its set of contacts a–b, and such set of contacts are actuated to open while the set of contacts a–c thereof, as well as its set of contacts d–e, are actuated to close as also described hereinafter. Switch DSLS is spring biased to normally close its set of contacts a–b thereof and such set of contacts are actuated to open as also hereinafter discussed.

A plurality of electrically controlled or actuated relays are employed and the control winding of each such relay is represented in FIG. 31 by a rectangle with the designation of the respective being disposed above the rectangle representing the respective relay winding. The electrical circuit controlling contacts of each such relay are shown below their respectively associated control winding (rectangle) and a broken line extends between each respective relay control winding and its contacts therebelow. The movable member of each set of relay contacts of a respective relay is designated by a different small case letter, and the fixed contact points of each relay and with which each movable contact member makes contact will be termed a front contact (downwardly pointing contact against which the respective movable contact member is closed when the respective relay control winding is energized) or a back contact (an upwardly pointing contact against which the respective movable contact member is closed when the respective relay control winding is deenergized.) Some of the relays shown are so-called slow acting relays and, in such case, an arrow extends through each movable contact or contact member of such relays and points in the direction or directions in which each respective relay (the movable contact members of each relay) are slow acting. The slow acting relays include slow release relays in which the movable contact members thereof are somewhat slow in opening or breaking contact with the fixed front contacts of the relays upon deenergization of the control windings of the relays and, therefore, are also slow in making contact with the fixed back contacts upon deenergization of the relay control windings, and a slow pickup, slow release relay LS1P whose movable contact member c is somewhat slow in breaking contact with the fixed back contact d of the relay, upon energization of the control winding of the relay, and whose movable contact member a is slow in opening or breaking contact with the front contact b of the relay upon deenergization of the relay control winding.

A first manually operable push-button electrical circuit controlling switch MPB is shown in FIG. 31 and such push-button switch is of the type whose electrical contacts are normally open but are actuated to and remain in an electrical circuit closing condition when the respective push button is manually pushed or pressed. After the pressing of said push-button switch and the closing of the contacts thereof, such contacts are reactuated to a circuit interrupting condition only when the push-button of the switch is manually pulled out of the pressed or closed condition thereof. A second manually operable push-button electrical circuit controlling switch SPB is shown in FIG. 31 and such pushbutton switch is also of the type whose electrical circuit controlling contacts are normally open and are actuated to an electrical circuit closing condition when the push button of the switch is manually pushed or depressed. Following such closing of the contacts of the switch, such contacts are again actuated to an open condition by a spring S when the push-button of the switch is no longer depressed.

A plurality of electric solenoid actuated or controlled pressurized fluid flow control valves WBV1, WBV2, DSV and USV are shown in FIG. 31 in the conventional manner, that is, by conventional symbols, and the pressurized fluid motors or cylinders USCY, DSCY, WBC1 and WBC2, shown in FIGS. 1 and 2, are shown schematically in FIG. 31 and are designated by respectively identical reference characters as in said drawings FIGS. 1 and 2 The electrically controlled clutch-brake CB and electric gear motor GM shown in FIGS. 4, 5 and 6 are represented in FIG. 31 by circles with the letters GM or CB disposed within the respective circles to designate whether the respective component is the gear motor or clutch-brake. A fifth pressurized fluid flow control valve VCV is shown in FIG. 31, such valve being actuated from a first to a second position by an electric solenoid winding, SW9 and from such second position to its first position (when the solenoid is deenergized) by a spring designated S1.

THere is provided a suitable source of direct current power of proper voltage and capacity for operation of the electrical clutch-brake CB, the previously mentioned electrically actuated relays, and the previously mentioned electrical solenoid actuated fluid flow control valves, but such source is not shown in the drawings for purposes of simplification thereof. However, the positive and negative terminals of said source are designated PS and N, respectively. This will be discussed more hereinafter. There is also provided a suitable source of alternating current for the energization of motor GM, such source being of proper voltage and capacity for the energization of such motor. However, such source is also not shown in the drawings but the terminals of such source are designated MX and Y, respectively. A suitable source of pressurized fluid, such as compressed air, is provided for the actuation of the pneumatic or pressurized fluid actuated apparatus shown in FIGS. 1, 2 and 31, and a suitable source of vacuum or negative pressure is provided for supply to the vacuum chucks VC shown in FIGS. 4, 5 and 6. However, said pressurized fluid and vacuum sources are also omitted from the drawings for purposes of simplification thereof.

OPERATIONAL EXAMPLES OF THE INVENTION

Referring to FIG. 31, taken in conjunction with FIGS. 1 through 6 where necessary for a clear understanding of the operation of the apparatus of the invention, it should be pointed out that rocker arm RA and, therefore, vacuum manifold VMF, vacuum head VH and its supported vacuum chucks such as VC, as well as rack RK, crank wheel CW, rocker arm cam RACM and vacuum cam VCM, are shown in FIGS. 4, 5 and 6, for illustrative purposes only, in a position for picking up a plurality or row of articles from a row thereof contained in a row of the pockets or nests such as TYAP embodied in a tray such as TYA (FIG. 20). However, these are not the normal positions of the apparatus prior to initial start-up thereof but, in such normal positions, rocker arm RA is in a vertical position and, therefore, vacuum head VH and its associated vacuum chucks VC and vacuum manifold VMF, are in raised positions. Also at such time crank wheel CW, and cams VCM and RACM are, with reference to FIG. 4 and moving in a counterclockwise direction, 90° in advance of their positions shown in FIG. 4. That is to say, such wheel and cams must move 90° in a clockwise direction from their normal positions to attain the positions of such parts shown in FIGS. 4, 5 and 6. Also in the normal positions of cams VCM and RACM, actuating arms AA7 and AA8 of limit switches LS7 and LS8 are in actuated and unactuated conditions, respectively. This will be readily apparent to those skilled in the art.

At the start-up of the apparatus, push-button switch MPB (FIG. 31) is manually actuated to close the circuits from the previously mentioned terminal MX of the alternating current power source to gear motor GM, and from the previously mentioned terminal PS of the direct current power source to supply such current to circuits for selectively energizing the previously mentioned relays, fluid flow control valves, and clutch brake CB over contacts of such relays or of the previously mentioned contacts of the limit switches. Also, at such time, pressurized fluid is supplied from said source thereof to fluid conduit CD1 and vacuum is supplied from said source thereof to fluid conduit CD11. Such pressurized fluid flows through valves WBV1, WBV2, DSV and USV in their normal positions and thence through conduits CD2, CD4, CD6 and CD9 to actuate the piston rods DPR and UPR of cylinders DSCY and USCY, respectively, to their retracted positions within their associated cylinders, and to actuate piston rods C1PR and C2PR2 of cylinders WBC1 and WBC2, respectively, to their extended positions while piston rod C2PR1 is actuated to its retracted position within cylinder WBC2. At the time of the previously mentioned depressing or pushing of push button MPB to supply electrical energy to the apparatus of the invention, the only components which become energized at such time are gear motor GM, as previously mentioned, and solenoid winding SW5 of fluid flow control valve DSV, such winding being so energized over a control circuit including contacts c–e of relay DS. This does not, however, disturb the above-mentioned position of valve DSV nor of piston rod DPR of cylinder DSCY.

Assuming that a stack of three of the trays such as TYA (FIGS. 20 and 21) and designated TYA1, TYA2 and TYA3 (FIG. 1) are in position for handling thereof by the apparatus, the bottom edge of the lower tray TYA1 of the stack would be in the position indicated by the broken line indicated at "B" in the upper right hand region of FIG. 1. (Refer also to FIG. 4 which illustrates trays TYA2 and TYA3 in their resultant positions after the start-up of the apparatus). It is pointed out however that, in actuality, said stack of trays would probably comprise more than three but only three are shown for purposes of simplification of the drawings. It is also pointed out that the upper part of trays TYA1 and TYA2 nest within the lower parts of trays TYA2 and TYA3, respectively, a very limited distance as previously pointed out. Additional trays can, of course, be added to said stack during the operation of the apparatus. Referring to FIG. 31, start push button SPB is now momentarily manually pushed or depressed and relay DS becomes energized or picked-up over a first pickup circuit including contacts a–b of push button SPB, and such relay closes its holding circuit including its own contacts a–b and contacts a–b of limit switch DSLS. The energization or pickup of relay DS opens at its contacts c–e an energizing circuit for solenoid winding SW5 of valve DSV and closes at its contacts c–d an energizing circuit for solenoid winding SW6 of such valve. This actuates valve DSV to interrupt the supply of pressurized fluid through conduit CD6 to the upper end of cylinder DSCY and supply such fluid over conduit CD7 to the lower end of said cylinder while connecting conduit CD6 to atmosphere or a suitable fluid sink SK3. Piston rod DPR is thereby actuated in an upward direction (see also FIG. 1) to actuate spider SP1 and its associated tray lowering shafts such as TLS in a corresponding upward direction. The energization of relay DS also closes at contacts f–g thereof the energizing or pickup circuits for slow release repeater relay DSP which then closes its contacts *a–b* to prepare an energizing circuit for walking beam relay WBF.

During the above-mentioned upward actuation of tray lowering shafts TLS, a part of the outer peripheral upper region of each of the caps such as TLSC of such shafts contact the edges DSCA (FIG. 12) of the down stacker cams such as DSC and push up against said edges to roatate such cams about their pivots and raise the edges of DSCB of the cams and, thereby, raise the aforementioned stack of trays including trays TYA1, TYA2 and ATYA3 since the lower peripheral rim or edge of lower tray TYA1, rests on said edges DSCB of the cams such as DSC. During such upward actuations or movements of the stack of trays, the lower edge of tray TYA1 is raised from the previously mentioned line indicated at "B" in FIG. 1 until the edges DSCB of the cams such as DSC have been moved entirely out from under the lower edge of tray TYAl. At such time the stack of trays fall a very short distance and the caps such as TLSC of the shafts such as TLS enter the corner regions of tray TYA1 adjacent said lower edge of such tray. Also at such time, annulus AN1 (FIG. 1) actuates actuating arm AA10 of down stacker limit switch DSLS and contacts *a–b* of such switch are actuated open to interrupt the previously mentioned holding circuit for relay DS (FIG. 31) which then releases and opens its contacts *c–d* and *f–g*, and closes its contacts *c–e* and *f–h*. Such actuation of the contacts of relay DS deenergizes solenoid winding SW6 of valve DSV and reenergizes solenoid winding SW5 of such valve to cause such valve to return to its normal condition and, thereby, supply pressurized fluid to conduit CD6 and thence to the upper end of down stacker cylinder DSCY (FIGS. 2 and 31) while connecting conduit DC7 to atmosphere or fluid sink SK3. This actuation lowers the tray lowering shafts such as TLS and tray TYA1 until the lower edge of such tray rests on the top surfaces of the tray support rails such as TSR (FIGS. 1, 3 and 4). When the shafts such as TLS begin their downward movement mentioned above, the down stacker cams such as DSC rotate counterclockwise clockwise (viewing FIG. 12) about their pivots under the influence of gravity, substantially aided by a part of the lower peripheral edges of the shaft caps such as TLSC contacting the edges such as DSCC of the down stacker cams and urging said rotation of the cams to move the edges such as DSCB thereof under the lower peripheral edge of tray TYA2 (FIG. 1) to thereby support such tray and the remainder of the stack of trays above tray TYA2. The downward movement of the shafts such as TLS permits actuating arm AA10 of limit switch DSLS (FIG. 1) to return to its normal position under the influence of its spring biasing feature and contacts *a–b* of such switch again close to again prepare the holding circuit for relay DS (FIG. 31).

The above mentioned closing of contacts *f–h* of relay DS (FIG. 31) momentarily closes a pickup or energizing circuit for a walking beam relay WBF, such circuit including said contacts *f–h*, contacts *a–b* of relay DSP, and contacts *a–b* of limit switch LS2. Relay WBF then picks up to close a holding circuit for itself, such circuit including its own contacts *a–b* and contacts *d–f* of limit switch LS1. Relay WBF is, thereby, maintained energized at such time. Slow release relay DSP subsequently releases and opens, at its contacts *a–b*, said pickup circuit for relay WBF. The pickup of relay WBF also closes, at contacts *c–d* thereof, an energizing circuit for solenoid winding SW2 of fluid flow control valve WBV1, such circuit including contacts *c–d* of limit LS2 and said contacts *c–d* of relay WBF. Valve WBV1 is thereby actuated to interrupt a supply of pressurized fluid to conduit CD2 and to the right hand end of cylinder WBC1 (viewing FIGS. 1 and 31) and to supply such fluid to the left hand end of such cylinder while connecting conduit CD2 to atmosphere or a suitable fluid sink SK1. This causes piston rod C1PR of cylinder WBC1 to be retracted within such cylinder to move walking beam WB and its associated cam WBC (FIGS. 1, 8 and 8a) in its right hand direction (viewing FIG. 1) and thereby permit contacts *c–d* of limit switch LS2 to be opened by the spring biasing feature of such switch. Said right hand movement of cam WBC also causes such cam to actuate arm AA3 of limit switch LS3 to close contacts *a–b* thereof (FIG. 31). Such operations deenergize solenoid winding SW2 of valve WBV1 and energize solenoid winding SW4 of valve WBV2 over contacts *a–b* of limit switch LS3.

The above described energization of solenoid winding SW4 of valve WBV2 actuates such valve to interrupt a supply of pressurized fluid to conduit CD4 and to the right hand end of cylinder WBC2 (viewing FIGS. 1 and 31) and to supply such fluid to conduit CD5 and, thence, to the left hand end of such cylinder while connecting conduit CD4 to atmosphere or a suitable fluid sink SK2. The piston rods C2PR1 and C2PR2 of cylinder WBC2 are thereby actuated in their right hand directions (viewing FIGS. 1 and 31) to rotate cranks CK1 and CK2 in counterclockwise directions about their supporting pivots or axles and, thereby, raise walking beam WB to raise walking beam tray actuators such as WBTA upwardly through their respectively associated openings such as RSPA embodied in and extending through rail support plate RSP (FIGS. 1 and 3) and, thereby, move some of said actuators into the spaces such as TYAB (FIG. 21) in tray TYA1 and between the rows of pockets such as TYAP (FIGS. 20 and 21) in tray TYA1, it being remembered that the tray actuators such as WBTA were moved in a right hand direction (viewing FIGS. 1 and 3) when walking beam WB was actuated in such direction as discussed previously. Said actuators continue to raise and, thereby, raise tray TYA1 a distance such that the lower edge of such tray no longer rests on the rails such as TSR on plate RSP.

As walking beam WB is moved upwardly as discussed above, cam WBC is moved out of contact with actuating arm AA3 of limit switch LS3 (FIG. 1) and into contact with actuating arm AA4 of limit switch LS4 to actuate contacts *a–b* of such switch to close (FIG. 31). The spring biasing feature of switch LS3 returns contacts *a–b* thereof (FIG. 31) to their normally open condition, thereby deenergizing solenoid winding SW4 of valve WBV2. The above-mentioned closing of contacts *a–b* of switch LS4 energizes solenoid winding SW1 of valve WBV1 to again supply pressurized fluid to conduit CD2 and connect conduit CD3 to fluid sink SK1. Such fluid is supplied to the right hand end of cylinder WBC1 (viewing FIG. 31) to actuate piston rod C1PR of such cylinder in the left hand direction (viewing FIGS. 1 and 31) and, thereby, move beam WB and tray actuators such as WBTA in a corresponding direction. Such operation moves tray TYA1 in the left hand direction a distance which corresponds to the distance between the centers of adjacent rows of pockets such as TYAP embodied in the trays such as TYA (FIGS. 20 and 21) and in the present specific instance embodied in tray TYA1. Said left hand movement of walking beam WB also moves cam WBC out of contact with actuating arm AA4 of limit switch LS4 (FIG. 1) and into contact with actuating arm AA5 of limit switch LS5 to actuate such arm to close contacts $a$–$b$ of such switch (FIG. 31). At such time the spring biasing feature of limit switch LS4 actuates contacts $a$–$b$ of such switch to open to deenergize solenoid winding SW1 of valve WBV1, and the above mentioned closing of contacts $a$–$b$ of switch LS5 energizes solenoid winding SW3 of valve WBC2 to, thereby, actuate such valve to supply pressurized fluid to conduit CD4 and thence to the right hand end of cylinder WBC2 while connecting conduit CD5 to fluid sink SK2. Such operation actuates piston rods C2PR1 and C2PR2 of cylinder C2PR1 in their left hand directions (viewing FIGS. 1 and 31) and cranks CD1 and CD2 are, thereby, caused to rotate in clockwise directions about their pivots or axles to lower walking beam WB and its tray actuators such as WBTA. This lowers tray TYA1 and removes such actuators from the previously mentioned spaces between the rows of pockets in such tray while the lower edge of such tray again comes to rest on the top surfaces of the rails such as TSR.

The above-described downward movement of walking beam WB moves cam WBC out of contact with actuating arm AA5 of limit switch LS5 and again into contact with actuating arm AA2 of limit switch LS2 to again close contacts $c$–$d$ of such switch to again energize solenoid winding SW2 of valve WBV1, it being remembered that relay WBF is maintained energized over its holding circuit at such time. Said movement of cam WBC out of contact with said actuating arm AA5 permits the spring biasing feature of switch LS5 to actuate contacts $a$–$b$ thereof to open and thereby deenergize solenoid winding SW3 of valve WBV2. The above-described energization of winding SW2 of valve WBV1 initiates another cycle of operations of walking beam WB and its tray actuators such as WBTA, such cycle being identical to that just described for such components and, therefore, for purposes of brevity of the description of the operation of the apparatus of the invention to the extent possible, not being repeated. Each cycle of operations of walking beam WB and its tray actuators such as WBTA moves tray TYA1 in the left hand direction (viewing FIGS. 1 and 3) a distance such as that mentioned in conjunction with the foregoing described cycle of operations of the walking beam and its tray actuators. Three such cycles of operations and movements of tray TYA1 occur at this time and, during the third of such cycles, the leading edge of tray TYA1 is moved into contact with the end of actuating arm AA1 of limit switch LS1 (FIGS. 1 and 3) and such arm is actuated to actuate contacts $a$–$c$ and $d$–$f$ of such limit switch to open, and contacts $a$–$b$ and $d$–$e$ of such switch to close (FIG. 31). Such closing of contacts $a$–$b$ of switch LS1 energizes slow pickup, slow release repeater relay LS1P which closes its contacts $a$–$b$ to prepare a second pickup or energizing circuit for relay DS following the delay provided by the slow pickup feature of relay LS1P. Said opening of contacts $d$–$f$ of switch LS1 opens the previously discussed holding circuit for relay WBF and such relay releases to open its holding circuit, and to open contacts $c$–$d$ of such relay and thereby prevent, at such time, another energization of winding SW2 of valve WBV1 by contacts $c$–$d$ of switch LS2 again being closed upon the subsequent downward actuation of walking beam WB, and the resultant actuation of actuating arm AA2 of switch LS2 by walking beam cam WBC. It is pointed out that, at the end of the third movement of tray TYA1 in the left hand direction as mentioned above, the centerline of the first or leading row of pockets such as TYAP (FIG. 20) in tray TYA1 are precisely positioned so that, when vacuum head VH is actuated to its position illustrated by the broken line outlines of such vacuum head shown in FIGS. 1 and 3, the longitudinal centerline of such vacuum head will be in vertical alignment with said centerline of said first or leading row of pockets, and one of the vacuum chucks, such as VC, supported or carried by vacuum head VH, will be in vertical axial alignment with the center of each of the pockets such as TYAP in tray TYA1.

The above-mentioned closing of contacts $d$–$e$ of switch LS1 temporarily closes an energizing circuit (FIG. 31) for clutch brake CB (FIGS. 4, 5 and 6) and the brake of such component is thereby released and the clutch thereof actuated to supply driven rotation, being supplied from the output shaft of motor GM (FIG. 5) through coupling CP to the input shaft of clutch brake CB and through such clutch brake, to the output shaft CB1 thereof. Such operation rotates crank wheel CW and cams VCM and RACM (see also FIGS. 18 and 19) in a clockwise direction (viewing FIG. 4) and, when cam RACM is rotated a few degrees so that the high spot RACMA (FIG. 19) thereof no longer actuates actuating arm AA7 of limit switch LS7 to maintain contacts $d$–$e$ thereof in an open condition, such contacts are closed, by the spring biasing feature of such switch, to close a second energizing circuit for clutch brake CB and maintain the clutch of such component energized for a period of time as hereinafter described. Slightly after the closing of said second energizing circuit, relay LS1P picks up to close its contacts $a$–$b$ and prepare a second pickup circuit for relay DS. Such pickup of relay LS1P also momentarily opens, at contacts $c$–$d$ of such relay, the first above described energizing circuit for clutch brake CB. It is pointed out that the apparatus shown in FIGS. 4, 5 and 6 is shown with the vacuum head such as VH in its article pickup position and, therefore, such drawing figures (and the broken line outlines of vacuum head VH in FIGS. 1 and 3) do not illustrate the initial positions of the apparatus as discussed above.

In the above mentioned initial position of drive or output shaft CB1 of clutch brake CB, crank wheel CW as well as cams VCM and RACM are, moving in a counterclockwise direction from the positions of such components illustrated in FIG. 4, at a position of rest ninety degrees in advance of such illustrated positions. However, upon the actuation of clutch brake CB as mentioned above, cam wheel CW is rotated clockwise to actuate rack connecting arm RCM and, thereby, rack RK in an upward direction to rotate spur gear SG (FIG. 6) in a direction to move rocker arm RA through a vertical arc of travel in a clockwise direction and towards its position shown in FIGS. 4, 5 and 6 of the drawings and, thereby, vacuum head VH towards its position shown in such drawing FIGS. as well as illustrated by the broken line outlines of such head shown in FIGS. 1 and 3. As said connecting arm RCM, said rack RK, rocker arm RA, and vacuum head VH and its supported chucks such as VC closely approach their positions shown in FIGS. 4, 5 and 6, vacuum cam VCM is sufficiently rotated so that portion VCMA (FIG. 18) of the outer periphery of such cam contacts and actuates actuating arm AA8 of limit switch LS8. Such actuation actuates contacts *a–b* of switch LS8 to their closed condition to energize solenoid winding SW9 of vacuum control valve VCV (FIG. 31) and such valve is thereby actuated to supply vacuum or negative pressure from conduit CD11 connected to the previously mentioned source of vacuum, through valve VCV to flexible hose or conduit FH2 and, thence, to vacuum manifold VMF (FIGS. 4, 5 and 6) and over the flexible hoses or conduits such as FH2 to the individual vacuum chucks such as VC supported by vacuum head VH. During further downward movement of said vacuum chucks VC to their positions shown in FIGS. 4, 5 and 6, the lower end of each of such chucks enters the respectively aligned one of the pockets in the first or leading row of pockets in tray TYA1 and comes into contact, or very close contact, with the article such as LH (FIGS. 24 and 25) in each respective one of said pockets to pick up each respective article for transfer thereof. At such time crank wheel CW is in its position shown in FIG. 4, and rack actuating arm RCM and its associated rack RK are in their uppermost positions shown in FIGS. 4, 5 and 6.

During further rotation of crank wheel CW, rack connecting arm RCM and rack RK are actuated downwardly by such crank wheel, and spur gear SG (FIG. 6) is rotated by rack RK in a direction to move rocker arm RA and its supported apparatus, such as vacuum manifold VMF, vacuum head VH and the chucks such as VC, as well as the articles now supported on the lower ends of such chucks, upward and counterclockwise (viewing FIG. 4) through a 180° vertical arc of travel towards the broken line outline of such parts shown in FIG. 4. Said articles are thereby removed from their respective pockets in the first or leading row thereof in tray TYA1 and are transferred toward apparatus at an article delivery location and the previously mentioned apparatus including a conveyor such as a walking beam conveyor WBA and its supporting means WBS shown briefly in FIGS. 4 and 6 and which, as previously set forth, do not, per se, form a part of the present invention but are shown in order to make the description of the operation of the apparatus of the invention complete. This will be further discussed hereinafter.

When vacuum head VH very closely approaches its position indicated by the broken line outline thereof shown in FIG. 4, vacuum cam VCM has been rotated sufficiently that the actuating arm AA8 of limit switch LS8 is no longer actuated by the outer periphery of the cam VCM and the spring biasing feature of switch LS8 actuates contacts *a–b* (FIG. 31) of such switch to open and deenergize solenoid winding SW9 of vacuum control valve VCV. Spring S1 of such valve then actuates valve VCV to its normal position shown in FIG. 31 and the vacuum supplied to flexible conduit or hose FH1 and, thence, to vacuum manifold VMF and the chucks such as VC, is thereby terminated, while hose or conduit FH1 is connected to atmosphere through conduit CD10 (FIG. 31). Such termination of vacuum to the chucks such as VC releases the row or plurality of articles carried on the bottom ends of the chucks and each respective article of said row thereof is thereby delivered to a different one of the plurality of recesses 1 through 5 shown in FIG. 4 on the top surface of the previously mentioned support means WBS for walking beam conveyor WBA, such delivery being accomplished with relatively precise positioning of said articles in their respective recesses.

At the time of said delivery of said articles, crank wheel CW has been rotated 180° from its position shown in FIGS. 4, 5 and 6 that is, has been rotated so that rack connecting arm RCM and rack RK are at the lowermost end of their vertical strokes. Crank wheel CW is continued to be rotated until it is in or closely approaches its aforesaid position 90° in advance of its position shown in FIG. 4, and rack connecting arm RCM and rack RK, during such further rotation of crank wheel CW, are moved upwardly to drive spur gear SG in a direction to move rocker arm RA and, thereby, vacuum manifold VMF and vacuum head VH, upward and clockwise through a 90° arc of travel and thus to their initial positions previously discussed, that is, to a position such that rocker arm RA is in a vertical position and the other parts actuated by the rocker arm are in respectively corresponding positions as will be readily apparent to those skilled in the art. As cam RACM is rotated in correspondence with said continued rotation of crack wheel CW, such cam is rotated to a position such that the high point RACMA (FIG. 19) of such cam again contacts actuating arm AA7 of limit switch LS7 to actuate such switch to open its contacts *a–c* and *d–e*, and to close its contact *a–b* (FIG. 31). The opening of contacts *d–e* of switch LS7 opens the control circuit for the clutch of clutch brake CB and such clutch brake is thereby actuated to disengage its output shaft CB1 from further driven rotation thereof while applying a braking force to such shaft. Further rotation of cams RACM, VCM and crank wheel CW is thereby temporarily terminated. The above-mentioned closing of contacts *a–b* of switch LS7 momentarily closes another pickup or energizing circuit for relay WBF and such relay momentarily picks up to close at its contacts *c–d* the previously discussed energizing circuit for solenoid winding SW2 of valve WBV1 and, thereby, initiate another but only a single cycle of actuations of walking beam WB (FIGS. 1 and 3) and its associated tray actuators such as WBTA as previously described. Tray TYA1 is, thereby, moved to the left (viewing FIG. 1) and the centers of the next succeeding row of pockets in such tray are moved to a position such that they will be beneath vacuum head VH and the axial centerlines of the chucks such as VC when such head and chucks are again actuated to their positions shown in FIGS. 4, 5 and 6, as hereinafter mentioned.

Referring further to FIG. 4, immediately subsequent to the aforesaid delivery of said row of articles to said sequence of recesses such as 1 through 5 in the walking beam support means WBS for walking beam conveyor WBA, such conveyor is intermittently actuated, by any suitable means not shown, to transfer the articles in said recesses 1 through 5 to recesses 2 through 6, respectively. Such transfers are intermittently sequentially repeated until the last of said articles (the article originally in recess 1) is transferred to recess 6, thus leaving said recesses 1 through 5 again empty. At some location remote from the aforesaid article delivery location in FIG. 4, the articles in the recesses in support means WBS for walking beam conveyor WBA are further sequentially transferred one at a time, as by a single vacuum chuck, to apparatus for further handling of said articles in any desired manner and such as previously briefly discussed but which does not, per se, form any part of the present invention. It is pointed out that, if deemed expedient or desirable, a suitable intermittently stepped article conveyor belt could be used in place of the walking beam arrangement of WBA and WBS briefly discussed.

Upon each actuation of walking beam conveyor WBA to sequentially transfer said articles as mentioned above, actuating arm AA9 of limit switch LS9 (FIG. 4) is actuated to cause contacts $a-c$ (FIG. 31) of such switch to momentarily open and contacts $a-b$ thereof to momentarily close, and to then again actuate said contacts $a-b$ and contacts $a-c$ to open and close, respectively. Such contacts control a relay counting chain comprising relays FC1 through FC5 and BC1 through BC5 (FIG. 31) such chain of relays counting said actuations of arm AA9 of limit switch LS9 or, rather, said actuations of said contacts of such switch. For example, at the initiation of a first transfer of said articles in recess 1 through 5 (FIG. 4) to said recesses 2 through 6, respectively, contacts $a-c$ and $a-b$ of limit switch LS9 are actuated to open and close, respectively, by the spring biasing feature of such switch. Such closing of said contacts $a-b$ of switch LS9 energizes slow release relay FC1 over electrical conductor EC1 and such relay then picks up to prepare over contacts $a-b$ of the relay an energizing circuit for relay BC1 including conductor EC2 and contacts $a-c$ of switch LS9. Towards the completion of said transfer of articles, actuating arm AA9 of switch LS9 is moved to its initial position to cause contacts $a-b$ and $a-c$ of switch LS9 to open and close respectively. The opening of contacts $a-b$ of switch LS9 deenergizes relay FC1 but, due to the slow release feature of such relay, contacts $a-b$ thereof do not immediately open and, therefore, the energizing or pickup circuit for relay BC1 is momentarily closed over said contacts $a-c$ of switch LS9, and relay BC1 is picked up to close a holding circuit including its own contacts $a-b$, electrical conductor EC3 and contacts $a-c$ of relay BC5. The picking up of relay BC1 also prepares at its contacts $d-c$ a pickup or energizing circuit for relay FC2 so that, upon the next transfer of said articles by walking beam conveyor WBA (FIG. 4) and actuation of the contacts of switch LS9, relay FC2 and, subsequently, relay BC2 become picked up or energized and the closing of contacts $d-c$ of relay BC2 prepares the energizing circuit for relay FC3 of the counting chain. Such sequential and progressive actuation of the relay counting chain continues until relay BC5 becomes picked up or energized at the completion of the fifth transfer of said articles which indicates that said recesses 1 through 5 in said support means WBS (FIG. 4) are now empty and, therefore, in condition to receive another row of five articles to be delivered thereto from the second row of such articles in the aforesaid tray TYA1 by said row or gang of vacuum chucks such as VC. The energization of said relay BC5 of said relay counting chain momentarily opens, at contacts $a-c$ of such relay, the holding circuits for relays BC1 through BC4 and such relays release. The relays of the relay counting chain are thus returned to their initial deenergized conditions in preparation for counting another sequence of five actuations of limit switch LS9 by the actuating arm AA9 thereof being operated by the aforesaid walking beam conveyor WBA. Relay counting chains such as that just discussed are well known to those skilled in the art. It is pointed out, however, that other apparatus, such as a stepping switch or a mechanical counting device for example, could be used in place of the relay counting chain for counting each said sequence of five actuations of walking beam conveyor WBA.

The above mentioned energization of relay BC5 also momentarily closes, at contacts $a-b$ of such relay, another energizing circuit for clutch brake CB and, therefore, upon said recesses 1 through 5 being emptied by said five actuations of walking beam conveyor WBA, output shaft CB1 of clutch brake CB is again rotated as previously described to actuate rocker arm RA and its associated parts through another cycle of operations of such apparatus to transfer the second row of articles in tray TYA1 to the recesses 1 through 5 in support means WBS for walking beam conveyor WBA, such actuations and transfer being similar to the operations of the apparatus as previously discussed. No operations of relay DS and of the tray lower shafts such as TLS occur at such time nor during the subsequent and below mentioned eight transfers of each of the remaining eight rows of articles from tray TYA1. It is pointed out, however, that each time a row of said articles in tray TYA1 is transferred and rocker arm RA returns to its initial position following such transfer, walking beam WB (FIG. 1) and the tray actuators such as WBTA are actuated through their cycle of movements to move the next successive row of articles in tray TYA1 to the position for the pickup of such articles during the next cycle of operations of rocker arm RA. Each such operation of walking beam WB and, thereby said actuators is caused by the momentary closing of contacts $c-d$ of relay WBF, such relay being momentarily energized at such time over contacts $a-b$ of limit switch LS7 and contacts $a-b$ of slow release repeater relay LS7P.

Following the transfer of the articles in the tenth or last row of pockets in tray TYA1, such tray is again advanced by walking beam WB and the tray actuators such as WBTA so that the actuating arm AA1 of limit switch LS1 (FIG. 3) is no longer contacted by the side of tray TYA1 and such arm and the contacts of limit switch LS1 are then returned by the spring biasing feature of such switch to their normal positions, that is, contacts $a-b$ of the switch open and contacts $a-c$ and $d-e$ close, these latter contacts preparing the holding circuit for relay WBF. The closing of such contacts $a-c$ at such time momentarily closes a second pickup circuit for relay DS including said contacts $a-c$ and contacts $a-b$ of slow release relay LS1P. The operation of the circuits and components shown in FIG. 31 is thereafter, with the additional operations described below, similar to that previously discussed when relay DS was energized by the manual pushing of push button SPB to energize such relay. Tray TYA2 is, therefore, lowered from the stack of trays and then advanced in three steps to locate the leading row of pockets in such tray in a position for transfer of the articles in such row as previously discussed for the transfers of articles from tray TYA1. The above mentioned additional operations that occur during the advancing of tray TYA2 is that tray TYA1 is also advanced in steps and, near the end of the second advance of tray TYA2, a part of the leading edge of tray TYA1, hereinafter referred to as tray TYA1A (FIGS. 1, 3 and 4) contacts and actuates actuating arm AA6 of limit switch LS6. Such actuation closes contacts a-b of limit LS6 (FIG. 31) and solenoid winding SW7 of fluid flow control valve USV is energized. This actuates such valve to supply pressurized fluid from conduit CD1 to conduit CD8 and thence to the lower end of cylinder USCY while connecting conduit CD9 to atmosphere or a suitable fluid sink SK4. The pressurized fluid supplied to the lower end of cylinder USCY actuates the piston rod UPR (FIGS. 2 and 31) in an upward direction to raise spider SP2 and, thereby, the tray raising shafts such as TRS (FIGS. 1 through 4). The upward actuation of shafts TRS causes the upper ends of such shafts to enter the bottom corner regions of tray TYA1A and to then raise such tray to an empty tray stacking position.

During the upward movement of tray TYA1A as mentioned above, the up stacker cams such as USC (FIGS. 1, 3, 4 and 11) pivotally supported in the tray guides such as TG2 are contacted by the peripheral rim of said tray in a region such as USCA of the curved edge of each such cam USC (FIG. 11).

During subsequent upward movement of tray TYA1A, each cam such as USC is urged to move within the slot in their respective supporting tray guide such as TG2 and against the spring pressure of the spring such as USCS associated with each respective cam such as USC and which normally bias each such cam to a position such as shown in FIG. 11. The upward movement of tray TYA1A actuates such cams as mentioned above until the lower peripheral rim of the tray is above edges such as USCB of the latch portion of each respective cam which is then moved under said peripheral edge of the tray TYA1A by each said spring such as USCS to thereafter support such tray.

Towards the end of the upward actuation of the tray raising rails such as TRS, the upper surface of annulus or ring AN2 (FIG. 1) secured to the outer periphery of right hand shaft TRS (viewing FIG. 1) contacts and actuates the actuating arm AA11 of limit switch USLS to close contacts a-b (FIG. 31) of such switch against the pressure of the spring biasing feature of such switch. It is pointed out that when tray TYA1A was first raised, the lading edge of such tray moved out of contact with actuating arm AA6 of limit switch LS6 and contacts a-b of such switch were then again actuated to open and interrupt the energizing circuit to solenoid winding SW7 of valve USV. The above mentioned closing of contacts a-b of limit switch USLS closes an energizing circuit for solenoid winding SW8 of valve USV and such valve is then actuated to return to its condition shown in FIG. 31. Such actuation interrupts the supply of pressurized fluid to conduit CD8 and the lower end of cylinder USCY and connects such conduit to fluid sink SK4. Said actuation of valve USV also again supplied pressurized fluid to conduit CD9 and, thence, to the upper end of cylinder USCY to actuate piston rod UPR of such cylinder is a downward direction and said spider SP2 and shafts such as TLS in a corresponding direction. The downward actuation of said shafts permits the spring biasing feature of the switch USLS to again actuate contacts a-b thereof to open and open the energizing circuit for solenoid winding SW8 of valve USV. When the shafts such as TLS have returned to their fully lowered or normal positions shown in FIGS. 1 and 4, the up-stacker or tray raising apparatus discussed above is all again in the normal conditions of such apparatus and remains in such conditions until the next succeeding tray (TYA2) is stepped or advanced so that actuating arm AA6 of limit switch LS6 is again actuated by the leading edge of such tray.

It is expedient to point out at this point that as each next succeeding tray is raised as described above, the top of respective tray which is then being raised enters the bottom one of the lowermost tray in a stack (if any) of empty trays which were previously raised and nests in said bottom tray to a very limited extent as previously discussed. Thus, when a stack of empty trays are present at said second location in said path of travel, such stack of trays is raised when another tray is added to the bottom of such stack, and each such tray of the stack is thereafter supported by the one therebelow with the exception of the bottom tray which is supported by the up-stacker cams such as USC. It is further pointed out that the operation of the apparatus as described above will continue until master push button MPB (FIG. 31) is pulled to cut off electrical energy to the apparatus or until no trays are available or supplied to the apparatus for emptying of the pockets therein. Furthermore, if the intermittent stepping of previously discussed conveyor WBA should be interrupted during a cycle of five actuations thereof so that the aforesaid relay counting chain (FIG. 31) does not count five such actuations, the operation of the apparatus of the invention will also be interrupted.

It should be pointed out that the apparatus of the invention can also be employed for periodically transferring each plurality or row of articles from each sequence or row of five articles supplied by a walking beam conveyor such as WBA to the recesses 1 through 5 on the walking beam conveyor support means such as WBS (or a conveyor belt including a similar number of such recesses). Each of such transfers would be from said recesses to each row of pockets in each empty tray lowered by the tray lowering apparatus and sequentially advanced so that each row of pockets in each said tray would be sequentially located at said intermediate location in said path of travel for receipt of a row of said articles. Assuming that walking beam conveyor WBA is operating in reverse to sequentially supply rows or sequences of five articles to recesses 1 through 5 at the location shown in FIG. 4, it is arranged so that each actuation of the conveyor to transfer an article from recess 6 to recess 5 would actuate arm AA9 of limit switch LS9 to count such actuations by the relay counting chain in the manner previously described. The above-mentioned and somewhat reversed operation of the apparatus is readily accomplished merely by turning crank wheel CW shown in FIGS. 4, 5 and 6 a rotational distance of 180° on output shaft CB1 of clutch-brake CB while leaving cams VCM and RACM in their same positions on such shaft. That is to say, crank wheel CW only would be turned 180° relative to its position and the positions of said cams shown in FIG. 4. This moves rack RK downwardly to rotate rocker arm RA and its supported apparatus to the position shown by the broken line outlines thereof shown in FIG. 4, that is, to the opposite end of the 180° arc of travel of rocker arm RA from that shown in FIGS. 4, 5 and 6, while said cams VCM and RACM ramain in the same relative rotational positions shown in FIG. 4. This causes the supply of vacuum to vacuum chucks VC to be so supplied just prior to vacuum head VH reaching its fully lowered position shown in FIG. 4 by the broken line outline of such head, and to be terminated just prior to said vacuum head reaching its fully lowered position at the right hand or clockwise end of its 180° arc of travel (viewing FIG. 4). This also causes rocker arm RA and its supported apparatus to move through their 180° arc of travel from the left hand end thereof to the right hand end thereof (when viewing FIG. 4) and to then return 90° to a vertical position or rocker arm RA and corresponding positions of its supported apparatus. Under such conditions, as said rocker arm approaches or reaches said vertical position, the high point RACMA on cam RACM (FIG. 19) would sufficiently depress or actuate arm AA7 of limit switch LS7 to open contacts c–d of such switch and thereby deenergize the clutch of clutch-brake CB and apply the brake thereof to temporarily interrupt further rotation of output shaft CB1 of the clutch brake. The remainder of the apparatus of the invention operates, at such time as previously described for transfer of articles from the pockets of full trays to said recesses 1 through 5. Of course, at the start up of the apparatus, push button SPB (FIG. 31) would have to be manually pushed or depressed to initiate an operation or a start up of the apparatus as previously discussed. Thus, as mentioned above, the apparatus can be readily arranged for reverse operation thereof, that is, for loading trays with articles rather than the unloading thereof as described in the foregoing detailed operational example of the invention.

It is also pointed out that the apparatus of the invention can be readily modified to handle trays which have a number of pockets in each row thereof of a greater or lesser number than five, that is, or a greater or lesser number than as shown and/or discussed as being in trays such as TYA and TYB shown in FIGS. 20 and 21, and 22 and 23, respectively, or a number of rows of such pockets of a greater or lesser number than 10, as previously mentioned as being in trays TYA and TYB. This will be readily apparent to those skilled in the art.

Although there is herein shown and described in detail only one form of apparatus embodying the invention, and a minor modification thereof to attain reverse operation of the apparatus, it will be understood that various additional changes and modifications may be made therein, within the purview of the accompanying claims, without departing from the spirit and scope thereof.

I claim:

1. Apparatus for handling each of a plurality of similar trays arranged in stacks and each embodying in the upper surface thereof a plurality of similar nests or pockets arranged in equally spaced apart rows in each tray and also arranged in equally spaced apart columns in each respective tray, the bottom of each such pocket having an internal perimetric configuration generally corresponding to the outer periphery of a similar disk-like article placed in each respective pocket; such apparatus comprising, in combination;

A. a suitably supported tray support means having an upper surface providing a horizontal path of travel for each said tray extending between first and second location at which said stacks of trays are delivered to and removed from said apparatus respectively, such path of travel also including an article transfer location intermediate said first and second locations;

B. tray guide means at said locations for maintaining the perimeters of the trays in a selected vertical alignment with said path of travel;

C. first actuable means at said first location for supporting the bottom tray of a stack delivered to such location and, thereby, the remainder of the trays of such stack;

D. second actuable means at said first location for actuating said first actuable means to release the bottom tray of said stack delivered to such location and lowering such released tray into a first end of said path of travel while leaving the tray next above such released tray as the bottom tray of the stack;

E. a pendent row of vacuum chucks having center axes spaced apart a distance equal to the spacing between the centers of the pocket of each said row of pockets in each said tray and equal in number to the number of pockets in each such row, such row of chucks periodically actuable between a delivery location for said disk-like articles and said intermediate location in said path of travel, and across such path to enter the pockets of each succeeding row of pockets intermittently moved to such intermediate location, such chucks being so actuable for transferring rows of such disk-like articles in a selected direction between said delivery location for such articles and each of said succeeding rows of tray pockets;

F. third actuable means for intermittently and stepwise moving each said tray, lowered into said first end of said path of travel, through such path towards said second location and a second end of the path of travel, each such stepwise movement of a tray being a distance substantially precisely equal to the distance between the centers of the pockets of each said column of pockets in such tray;

G. fourth actuable means at said second location for raising each said tray moved to said second end of said path of travel and out of such path;

H. fifth actuable means at said second location for supporting each said tray raised out of said path of travel at said second end of such path, each next succeeding tray so raised supporting preceding trays to reform a stack thereof; and, I. a control system including motor means for actuating said row of chucks and said actuable means in a preselected sequence to sequentially;

a. release and lower the bottom tray of a stack of trays, delivered to said first location, into said first end of said path of travel;

b. move said lowered tray stepwise through said path of travel until the first row of pockets in such tray are precisely positioned, at said intermediate location in said path, for receipt of said row of chucks;

c. actuate said row of chucks to transfer a row of said disk-like articles in said selected direction between said article delivery location and said first row of pockets in said tray;

d. following said transfer of said articles, move said tray through said path of travel until the second row of pockets in such tray are precisely positioned at said intermediate location and, then, again actuating said row of chucks to transfer a row of said articles in said selected direction of transfer;

e. following the foregoing cycle of actuations, repeat such actuations until the last of the rows of pockets in said tray is moved from said intermediate location;

f. release and lower the then bottom tray of said stack of trays into said first end of said path of travel and, then, move the pre-viously lowered tray stepwise until the leading end thereof reaches said second end of said path of travel while simultaneously similarly moving the second lowered tray until the first row of pockets in such second lowered tray are positioned at said intermediate location for receipt therein of said row of chucks;

g. raise the first lowered tray out of said second end of said path of travel when the leading end of such tray reaches such end of said path; and, thereafter, h. repeat actuations and movements a through g as long as a tray is available at said first location for handling thereof.

2. Apparatus in accordance with claim 1 and in which said disk-like articles are transferred from said rows of pockets in said trays to said article delivery location.

3. Apparatus in accordance with claim 1 and in which said disk-like articles are transferred from said article delivery location to said rows of pockets in said trays.

4. Apparatus in accordance with claim 1 and in which each article of said rows of articles transferred between said intermediate location and said article delivery location are handled one at a time at such delivery location, and further including means at such delivery location for counting such handling of each one of said articles, said row of vacuum chucks being actuated to transfer another row of the articles only after said counting means has counted the handling of a number of articles equal to the number of articles in each said row thereof.

5. Apparatus in accordance with claim 2 and in which each article of said rows of articles transferred between said intermediate location and said article delivery location are handled one at a time at such delivery location, and further including means at such delivery location for counting such handling of each one of said articles, said row of vacuum chucks being actuated to transfer another row of the articles only after said counting means has counted the handling of a number of articles equal to the number of articles in each said row thereof.

6. Apparatus in accordance with claim 3 and in which each article of said rows of articles transferred between said intermediate location and said article delivery location, are handled one at a time at such delivery location and further including means at such delivery location for counting such handling of each one of said articles, said row of vacuum chucks being actuated to transfer another row of the articles only after said counting means has counted the handling of a number of articles equal to the number of articles in each said row thereof.

7. Apparatus as in claim 1 and in which said means for intermittently and stepwise moving each of said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

8. Apparatus as in claim 2 and in which said means for intermittently and stepwise moving each said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

9. Apparatus as in claim 3 and in which said means for intermittently and stepwise moving each said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

10. Apparatus as in claim 4 and in which said means for intermittently and stepwise moving each said tray comprises a walking beam is actuated through a vertical and a relatively exactly rectangular pattern for said intermittent movements of said trays through said path of travel and for said distance substantially precisely equal to the distance between the centers of the pockets of each said column of pockets of each said tray.

11. Apparatus as in claim 5 and in which said means for intermittently and stepwise moving each said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

12. Apparatus as in claim 6 and in which said means for intermittently and stepwise moving each said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

13. Apparatus for handling each of a plurality of similar trays arranged in stacks and each embodying in the upper surface thereof a plurality of similar nests or pockets arranged in equally spaced apart rows in each tray and also arranged in equally spaced apart columns in each respective tray, the bottom of each such pocket having an internal perimetric configuration generally corresponding to the outer periphery of a similar disk-like article placed in each respective pocket; such apparatus comprising, in combination;

A. a suitably supported tray support means having an upper surface providing a horizontal path of travel for each said tray between first and second locations for delivering and removing said stacks of trays to and from said apparatus, and an article transfer location intermediate said first and second locations;

B. tray guide means at said first and second locations for maintaining the perimeters of the trays of each said stack in a selected vertical alignment with said path of travel;

C. first actuable means at said first location for supporting the bottom tray of a stack delivered to said first location and, thereby, the remainder of the trays of such stack;

D. second actuable means at said first location and including first motor means for actuating said first actuable means to release the bottom tray of said stack delivered to said first location and lowering such released tray into a first end of said path of travel while leaving the tray next above the released tray as the bottom tray of the stack;

E. a pendent row of vacuum chucks having center axes spaced apart a distance equal to the spacing between the centers of the pockets of each said row of pockets in each tray and equal in number to the number of pockets in each such row, such row of chucks periodically actuable between delivery location for said disk-like articles and said intermediate location in said path of travel and across such path to enter the pockets of each succeeding row of tray pockets intermittently moved to and from such intermediate location, such chucks being so actuable, by second motor means, for transferring rows of said disk-like articles in a selected direction between said delivery location for such articles and each of said succeeding rows of tray pockets;

F. third actuable means including third and fourth motor means, for intermittently and stepwise moving each said tray lowered into said first end of said path of travel through such path towards said second location and a second end of the path of travel, each such stepwise movement of a tray being a distance substantially precisely equal to the distance between the centers of the pockets of each said column of pockets in such tray;

G. fourth actuable means at said second location and including fifth motor means for raising each said tray moved to said second end of said path of travel and out of such path;

H. fifth actuable means at said second location for supporting each said tray raised out of said path of travel at said second end of such path, each next succeeding tray so raised supporting preceding trays to reform a stack thereof; and, I. control means for selectively energizing said motor means to actuate said row of chucks and said actuable means in a preselected sequence to sequentially, a. release and lower the bottom tray of a stack of trays, delivered to said first location, into said first end of said path of travel;

b. move said lowered tray stepwise through said path of travel until the first row of pockets in such tray are precisely positioned, at said intermediate location in said path, for receipt of said row of chucks;

c. actuate said row of chucks to transfer a row of said disk-like articles in said selected direction between said article delivery location and said first row of pockets in said tray;

d. following said transfer of said articles, move said tray stepwise through said path of travel until the second row of pockets in such tray are precisely positioned at said intermediate location and, then, again actuating said row of chucks to transfer a row of articles in said selected direction of transfer;

e. following the foregoing cycle of actuations, repeat such actuations until the last of the rows of pockets in said tray is moved from said intermediate location;

f. release and lower the then bottom tray of said stack of trays into said first end of said path of travel and, then, move the previously lowered tray stepwise until the leading end thereof reaches said second end of said path of travel while simultaneously similarly moving the second lowered tray until the first row of pockets in such second lowered tray are positioned at said intermediate location for receipt therein of said row of chucks;

g. raise the first lowered tray out of said second end of said path of travel when the leading end of such tray reaches such end of said path; and, thereafter, h. repeat actuations and movements *a* through *g* as long as a tray is available at said first location for handling thereof.

14. Apparatus in accordance with claim 13 and in which said disk-like articles are transferred from said rows of pockets in said trays to said article delivery location.

15. Apparatus in accordance with claim 14 and in which rows of said disk-like articles are transferred from said article delivery location to said rows of pockets in said trays.

16. Apparatus in accordance with claim 13 and in which each article of said rows of articles transferred between said intermediate location and said article delivery location are handled one at a time at such delivery location, and further including means at such delivery location for counting each handling of each one of said articles, said row of vacuum chunks being actuated to transfer another row of the articles only after said counting means has counted the handling of a number of articles equal to the number of articles in each said row thereof.

17. Apparatus in accordance with claim 14 and in which each article of said rows of articles transferred between said intermediate location and said article delivery location are handled one at a time at such delivery location and further including means at such delivery location for counting such handling of each one of said articles, said row of vacuum chucks being actuated to transfer another row of the articles only after said counting means has counted the handling of a number of articles equal to the number of articles in each said row thereof.

18. Apparatus in accordance with claim 15 and in which each article of said rows of articles transferred between said intermediate location and said article delivery location are handled one at a time at such delivery location and further including means at such delivery location for counting such handling of each one of said articles, said row of vacuum chucks being actuated to transfer another row of the articles only after said counting means has counted the handling of a number of articles equal to the number of articles in each said row thereof.

19. Apparatus as in claim 13 and in which said means for intermittently and stepwise moving each said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

20. Apparatus as in claim 14 and in which said means for intermittently and stepwise moving each said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

21. Apparatus as in claim 15 and in which said means for intermittently and stepwise moving each said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

22. Apparatus as in claim 16 and in which said means for intermittently and stepwise moving each said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

23. Apparatus as in claim 17 and in which said means for intermittently and stepwise moving each said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

24. Apparatus as in claim 18 and in which said means for intermittently and stepwise moving each said tray comprises a walking beam which is actuated through a vertical and a relatively exactly rectangular pattern for said intermittent movements of said trays through said path of travel and for said distance substantially precisely equal to the distance between the centers of the pockets of each said column of pockets in each said tray.

* * * * *